United States Patent
Shimoda et al.

(10) Patent No.: US 11,101,516 B2
(45) Date of Patent: Aug. 24, 2021

(54) BATTERY HOLDER, BATTERY UNIT, AND BATTERY COMPONENT INCLUDING BATTERY HOLDER AND BATTERY UNIT

(71) Applicants: Shimano Inc., Osaka (JP); Murata Manufacturing Co., Ltd., Nagaokakyo (JP)

(72) Inventors: Makoto Shimoda, Osaka (JP); Yoshitaka Nose, Osaka (JP); Yuya Yoneda, Osaka (JP); Taihei Nishihara, Osaka (JP); Koji Wada, Fukushima (JP)

(73) Assignees: Shimano Inc., Osaka (JP); Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/603,153

(22) Filed: May 23, 2017

(65) Prior Publication Data
US 2018/0006277 A1    Jan. 4, 2018

(30) Foreign Application Priority Data
Jun. 30, 2016    (JP) .............................. JP2016-131026

(51) Int. Cl.
*H01M 50/20*    (2021.01)
(52) U.S. Cl.
CPC ................................... *H01M 50/20* (2021.01)
(58) Field of Classification Search
CPC ............................... H01M 2/10; H01M 50/20
See application file for complete search history.

(56) References Cited

U.S. PATENT DOCUMENTS 6,577,101 B1 * 6/2003 Takeshita ............ H01M 2/1022
320/112

FOREIGN PATENT DOCUMENTS

| JP | 07045262 A | 2/1995 |
| JP | 9-226382 A | 9/1997 |
| JP | 09-226653 A | 9/1997 |
| JP | 10-181651 A | 7/1998 |
| JP | 2000-238675 A | 9/2000 |
| JP | 2002-145147 A | 5/2002 |
| JP | 2002-193165 A | 7/2002 |
| JP | 3682734 B2 | 8/2005 |
| JP | 2006-049194 A | 2/2006 |

OTHER PUBLICATIONS

Iseno et al. JP 2002-193165. Jul. 10, 2002. English machine translation by EPO. (Year: 2002).*
Hakamata et al. JP H10-181651. Jul. 7, 1998. English machine translation by Google Patents. (Year: 1998).*

* cited by examiner

*Primary Examiner* — James Lee
(74) *Attorney, Agent, or Firm* — Global IP Counselors, LLP

(57) ABSTRACT

A battery holder includes a first base, a first restriction portion and a holding portion. The first base is opposed to one end of a battery unit in a first direction in the state in which the battery unit is located at a holding position. The first restriction portion is configured to restrict relative movement of the battery unit and the first base in the first direction. The holding portion is movable to a first position, at which the battery unit contacts a held portion of the battery unit, and a second position, at which the holding portion is separated from the held portion.

27 Claims, 12 Drawing Sheets

BATTERY HOLDER, BATTERY UNIT, AND BATTERY COMPONENT INCLUDING BATTERY HOLDER AND BATTERY UNIT

CROSS-REFERENCE TO RELATED APPLICATIONS

This application claims priority to Japanese Patent Application No. 2016-131026, filed on Jun. 30, 2016. The entire disclosure of Japanese Patent Application No. 2016-131026 is hereby incorporated herein by reference.

BACKGROUND

Field of the Invention

The present invention relates to a battery holder, a battery unit, and a battery component including the battery holder and the battery unit.

Background Information

Japanese Laid-Open Patent Publication No. 9-226653 (Patent document 1) discloses a battery component including a battery holder and a battery unit. The battery component may take in a state in which the battery unit is held by the battery holder and a state in which the battery unit is removed from the battery holder.

When attaching the battery unit to the battery holder, the battery holder may not be able to stably hold the battery unit if the battery unit and the battery holder are too far from each other. Thus, to stably hold the battery unit with the battery holder, burdensome adjustments are necessary to position the battery unit and the battery holder.

SUMMARY

In a first aspect of the invention, a battery holder includes a first base, a first restriction portion and a holding portion. The first base opposes one end of a battery unit in a first direction in the state in which the battery unit is located at a holding position. The first restriction portion is arranged on the first base and configured to restrict relative movement of the battery unit and the first base in the first direction. The holding portion is movably arranged on the first base between a first position, at which the holding portion contacts a held portion of the battery unit and holds the battery unit at the holding position, and a second position, at which the holding portion is separated from the held portion. When the battery unit is located at the holding position, the relative position of the battery unit and the first base in the first direction is set by the first restriction portion. This facilitates the positioning of the battery holder and the battery unit. Further, the battery holder and the battery unit can be properly positioned. This configuration ensures that the battery unit is held at the holding position.

In a second aspect of the invention, in the battery holder according to the first aspect, the first restriction portion includes at least one of a first protrusion and a second recess. The first protrusion is receivable in a first recess arranged in a side wall of the battery unit that extends along the first direction, and the second recess is configured to receive a second protrusion arranged on the side wall of the battery unit. A structure in which a protrusion and a recess are fitted together restricts relative movement of the battery unit and the first base on the first direction. This configuration simplifies the structure of the first restriction portion.

In a third aspect of the invention, in the battery holder according to any one of the preceding aspects, the first base includes a first portion opposed to a side wall of the battery unit that extends along the first direction. The first portion sets the battery unit at the proper position relative to the base in the direction orthogonal to the side wall of the battery unit.

In a fourth aspect of the invention, in the battery holder according to any one of the preceding aspects, the first restriction portion is arranged on the first portion. The arrangement of the first restriction portion on the first portion allows the first restriction portion to be shaped with an easy structure such as a protrusion or a recess.

In a fifth aspect of the invention, in the battery holder according to any one of the preceding aspects, the first restriction portion is formed integrally with at least a portion of the first base. Since the first restriction portion is formed integrally with the first base, the number of components is reduced.

In a sixth aspect of the invention, the battery holder according to any one of the preceding aspects further includes a pair of supports arranged on the first base. The supports are configured to restrict movement of the battery unit at the holding position in a direction opposite to a direction in which the battery unit is removed from the battery holder. The supports are spaced apart from each other on the first base to allow for arrangement of a cable in between. The supports allow the battery unit to be stably held at the holding position. When a cable is arranged between the two supports, interference is limited between the cable and the battery unit.

In a seventh aspect of the invention, the battery holder according to any one of the preceding aspects further includes a second base that is spaced apart from the first base in the first direction to allow the battery unit to be arranged between the first base and the second base. The second base is configured to hold another end of the battery unit in the first direction in the state in which the battery unit is located at the holding position. The battery unit located at the holding position is held from two sides by the first base and the second base in the first direction. This stably holds the battery unit at the holding position.

In an eighth aspect of the invention, the battery holder according to any one of the preceding aspects further includes a second restriction portion arranged on the second base. The second restriction portion is configured to restrict relative movement of the battery unit and the second base in the first direction. The second restriction portion sets the position of the battery unit relative to the battery holder in the first direction. Thus, the battery unit is easily positioned relative to the battery holder and properly distanced from the battery holder. This configuration ensures that the second base holds the battery unit at the holding position.

In a ninth aspect of the invention, in the battery holder according to any one of the preceding aspects, the second restriction portion includes at least one of a third protrusion and a fourth recess. The third protrusion is receivable in a third recess arranged in a side wall of the battery unit that extends along the first direction, and the fourth recess is configured to receive a fourth protrusion arranged on the side wall of the battery unit. Relative movement of the battery unit and the second base in the first direction is restricted by a structure in which the protrusion and the recess are fitted together. This configuration simplifies the structure of the second restriction portion.

In a tenth aspect of the invention, in the battery holder according to any one of the preceding aspects, the third protrusion of the second restriction portion configures a pivot point about which the battery unit is pivoted upon removal of the battery unit from the battery holder at the holding position, and the third protrusion includes a distal end having a curved shape. In a state in which the battery unit is located at the holding position and the third recess of the battery unit and the third protrusion of battery holder are fitted together, removal of the battery unit from the battery holder pivots the battery unit about the third protrusion. This configuration facilitates the removal of the battery unit. Further, the distal end of the third protrusion is curved. Thus, the battery unit can be smoothly pivoted.

In an eleventh aspect of the invention, the battery holder according to any one of the preceding aspects further includes a pair of ribs arranged on the second base. The ribs sandwich a pair of side walls of the battery unit that extend in the first direction. The position of the battery unit relative to the second base can be set in a suitable manner in the direction in which the two ribs are spaced apart.

In a twelfth aspect of the invention, in the battery holder according to any one of the preceding aspects, the ribs are receivable in corresponding fifth recesses arranged in the battery unit. This configuration allows the battery unit to be reduced in size in the direction in which the two ribs are separated.

In a thirteenth aspect of the invention, the battery holder according to any one of the preceding aspects further includes a plug arranged on the second base. The plug is electrically connectable to the battery unit. The arrangement of the plug on the second base allows power to be supplied from the battery unit to the battery holder via the plug in a state in which the battery unit is held by the battery holder.

(14) In a fourteenth aspect of the invention, a battery unit includes an end in a first direction held by a battery holder in a state in which the battery unit is located at a holding position. The battery unit includes a housing, a held portion and a third restriction portion. The housing is configured to accommodate a battery cell. The held portion is arranged on one end of the housing in the first direction to contact a holding portion of the battery holder that is movable relative to the housing. The held portion is arranged to hold the battery unit at the holding position when in contact with the holding portion. The third restriction portion is arranged on the one end of the housing in the first direction to restrict relative movement of the battery unit and the battery holder in the first direction. The third restriction portion sets the position of the battery unit relative to the battery holder in the first direction. Thus, the battery unit is configured to be easily positioned relative to the battery holder and properly distanced from the battery holder. This configuration ensures that the holding portion holds the battery unit at the holding position.

In a fifteenth aspect of the invention, in the battery holder according to the preceding aspect, the third restriction portion includes at least one of a first recess and a second protrusion. The first recess is configured to receive a first restriction portion of the battery holder, and the second protrusion is receivable in the first restriction portion of the battery holder. Relative movement of the battery unit and the battery holder in the first direction is restricted by the structure in which a protrusion and a recess are fitted together. This configuration simplifies the structure of the third restriction portion.

In a sixteenth aspect of the invention, in the battery holder according to any one of fourteenth aspect and the fifteenth aspect, the third restriction unit includes the first recess, the first recess is arranged in a side wall of the battery unit extending along the first direction, and the first recess extends along a direction in which the battery unit is removed from the battery holder. When attaching the battery unit to the battery holder, the insertion of the first restriction portion of the battery holder into the recess guides the battery unit to the holding position. This configuration facilitates the attachment of the battery unit to the battery holder.

In a seventeenth aspect of the invention, a battery component including the battery holder according to any one of the first to thirteenth aspects, and the battery unit according to any one of the fourteenth to sixteenth aspects.

The battery holder, the battery unit, and the battery component that includes the battery holder and the battery unit facilitate positioning of the battery holder and the battery unit.

Also, other objects, features, aspects and advantages of the disclosed battery holder, the disclosed battery unit and the disclosed battery component will become apparent to those skilled in the art from the following detailed description.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
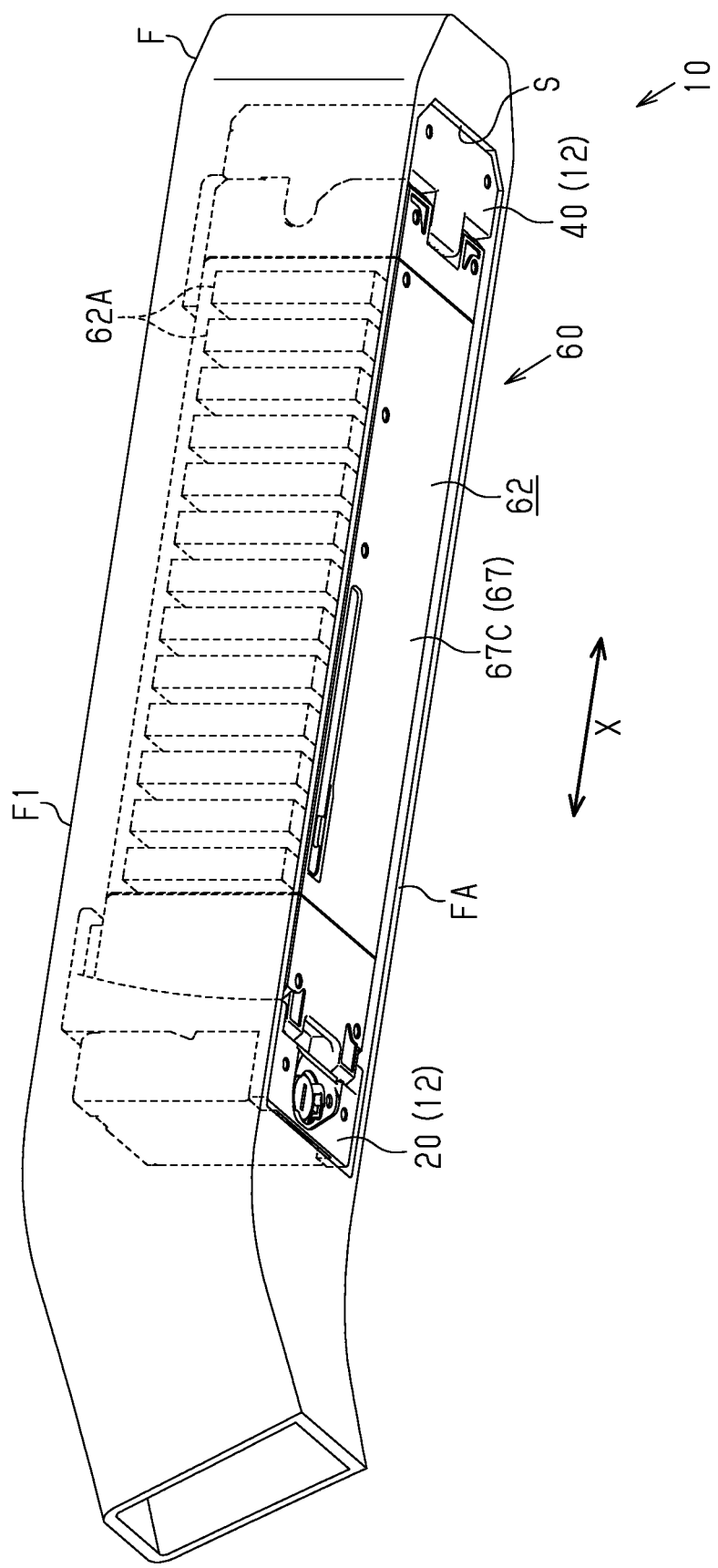
FIG. 1 is a perspective view showing a battery component of a first embodiment and a portion of a bicycle frame in a state in which the battery component is coupled to the bicycle frame.

FIG. 1 shows a battery component 10 that is used in a state accommodated in, for example, an accommodating space S of a subject member F. When the battery component 10 is used accommodated in the accommodating space S, it is preferred that the battery component 10 be entirely arranged in the accommodating space S. One example of the subject member F is a bicycle. When arranging the battery component 10 on a bicycle, it is preferred that the battery component 10 be arranged on one of a frame, a front fork, a handlebar, a stem, a seatpost, a rear carrier, and a front carrier. The frame of the bicycle includes at least one of a top tube, a head tube, a down tube F1, a seat tube, a chainstay and a seatstay. In the first embodiment, the battery component 10 is arranged on the down tube F1. In a state in which the bicycle is on level ground, the down tube F1 extends downward from the front fork to the crankshaft. The down tube F1 includes an opening FA that is open toward the lower side in a state in which the bicycle is on level ground. The opening FA is sized to allow the battery component 10 to be inserted into the accommodating space S. The down tube F1 is formed so that, for example, the accommodating space S is substantially cuboid.

The battery component 10 includes a battery holder 12 and a battery unit 60. The battery holder 12 is configured to hold the battery unit 60 when the battery unit 60 is at least located at a first holding position. FIG. 1 shows a state in which the battery unit 60 is located at the first holding position.

Figure 2:
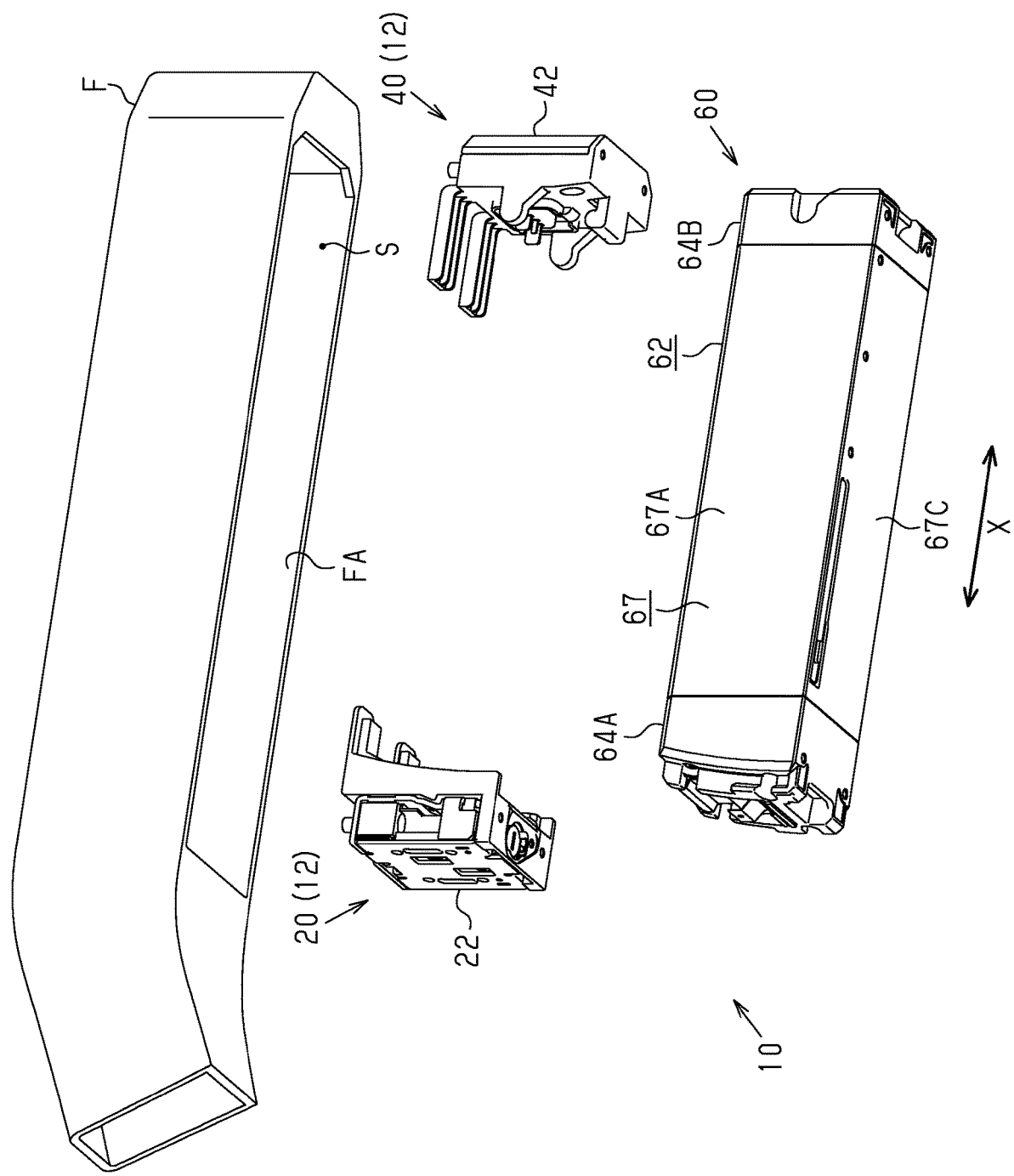
FIG. 2 is an exploded perspective view of the battery component and the portion of the bicycle frame shown in FIG. 1.

As shown in FIG. 2, the battery unit 60 is substantially cuboid and elongated in a longitudinal direction. The battery unit 60 is configured to supply power via the battery holder 12 to an element electrically connected to the battery holder 12 when held by the battery holder 12 at the first holding position (refer to FIG. 1). The element that is electrically connected to the battery holder 12 includes an electric component. An electric component includes at least one of an assist drive unit, an electric suspension, an electric seatpost, a display unit, a cycle computer and an electric operation unit. The battery unit 60 includes a housing 62. The housing 62 is configured to accommodate a plurality of battery cells 62A (refer to FIG. 1). The housing 62 is formed from a synthetic resin. The housing 62 is box-shaped and elongated in a longitudinal direction.

The battery holder 12 includes a first battery holder 20 and a second battery holder 40. The first battery holder 20 and the second battery holder 40 are coupled to the subject member F. The first battery holder 20 and the second battery holder 40 are spaced apart and separated from each other. The first battery holder 20 is configured to hold a first end 64A of the battery unit 60. The second battery holder 40 is configured to hold a second end 64B of the battery unit 60. The first end 64A is one end of the battery unit 60 in a first direction X when the battery unit 60 is located at the first holding position. The second end 64B is the other end of the battery unit 60 in the first direction X when the battery unit 60 is located at the first holding position. The first direction X is along the longitudinal direction of the battery unit 60. In a state in which the battery component 10 is coupled to the bicycle, the first direction X is along the direction in which the down tube of the bicycle extends. In the subject member F, it is preferred that the first battery holder 20 be located at a higher position than the second battery holder 40. However, the second battery holder 40 can be located at a higher position than the first battery holder 20.

The battery unit 60 includes four side walls 67 extending along the first direction X. The side walls 67 include two oppositely facing first side walls 67A, a second side wall 67B, (refer to FIG. 4) and a third side wall 67C. The side walls 67A include side surfaces of the battery unit 60 that extend along the direction in which the battery unit 60 is removed from the battery holder 12. The removal direction is the direction in which the battery unit 60 is moved when removed from the battery holder 12. The second and third side walls 67B and 67C include side surfaces of the battery unit 60 extending along a second direction Y (refer to FIG. 4) that is orthogonal to the first direction X and the removal direction. The second side wall 67B faces the direction opposite to the removal direction (hereafter referred to as "the attaching direction"). The attaching direction is along the direction in which the battery unit 60 is moved when attached to the battery holder 12. The third side wall 67C faces the removal direction. In a state in which the battery component 10 is coupled to the bicycle, the second direction Y is along the widthwise direction of the bicycle and extends toward the right and left with respect to the traveling direction of the bicycle.

Figure 3:
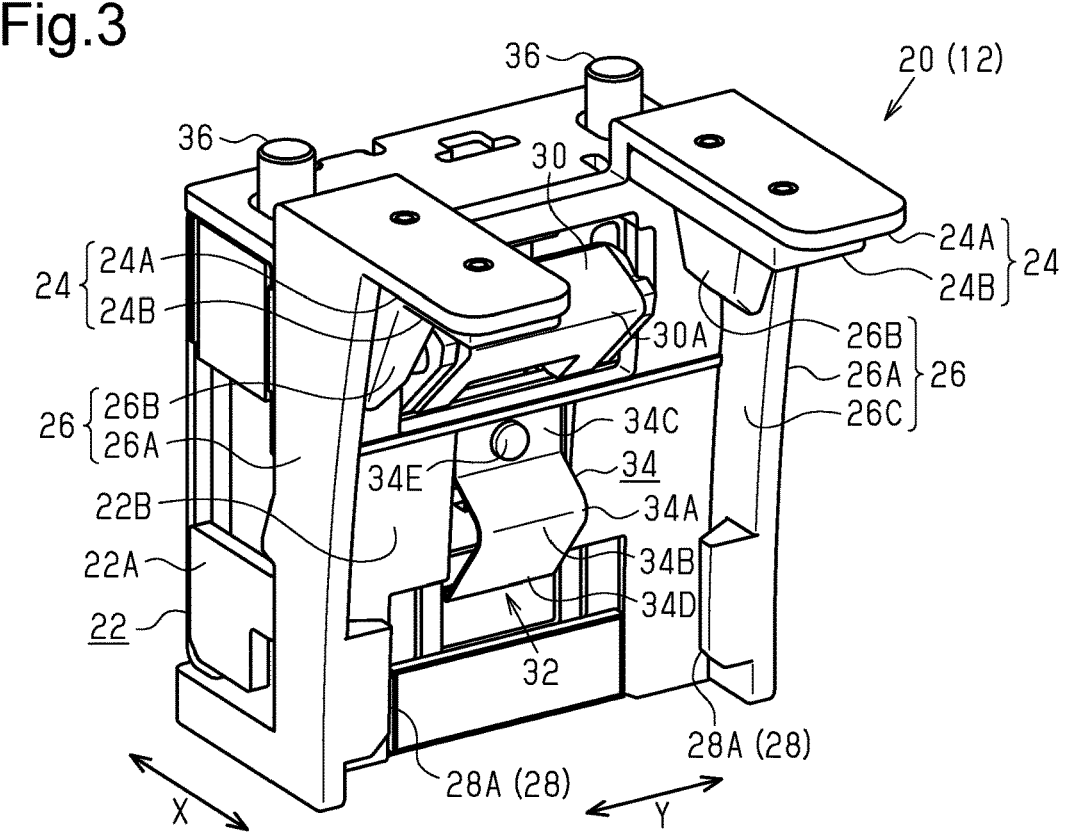
FIG. 3 is a perspective view of a first battery holder shown in FIG. 1.

As shown in FIG. 3, the first battery holder 20 includes a first base 22. The first base 22 is provided with a first holding portion 30 and a second holding portion 32. The first base 22 opposes the first end 64A of the battery unit 60 (refer to FIG. 2) when the battery unit 60 is located at the first holding position. The first end 64A includes a first end surface 66A of the battery unit 60 (refer to FIG. 4) and the ends of the side walls 67A to 67C of the battery unit 60 at the side of the first end surface 66A.

The first base 22 includes a main body 22A and a pair of first portions 26A. The main body 22A can be formed integrally or separately from the first portions 26A. The main body 22A can be configured by one or more parts. The main body 22A includes a support surface 22B. The support surface 22B opposes the first end surface 66A of the battery unit 60 when the battery unit 60 is located at the first holding position. The first portions 26A are opposed to the side walls 67A of the battery unit 60 (refer to FIG. 4). It is preferred that the first portions 26A be spaced apart in the second direction Y and be located at the two ends of the main body 22A in the second direction Y. The first portions 26A extend from the main body 22A respectively opposing the side walls 67A of the battery unit 60. The first portions 26A extend from one end to the other end of the main body 22A in the removal direction.

The first holding portion 30 is movable to a first position and a second position. At the first position, the first holding portion 30 contacts a held portion 68 of the battery unit 60 to hold the battery unit 60 at the first holding position (refer to the first holding portion 30 shown in double-dashed line in FIG. 12). At the second position, the first holding portion 30 is separated from the held portion 68 (refer to the first holding portion 30 shown in solid lines in FIG. 12). When the first holding portion 30 is located at the first position, the first holding portion 30 projects out of the support surface 22B. When the first holding portion 30 is located at the second position, the first holding portion 30 can project out of the support surface 22B but does not necessarily have to project out of the support surface 22B. The first holding portion 30 is pivotally supported by the first base 22 to pivot to either one of the first position and the second position about the first base 22.

In the removal direction, the second holding portion 32 is at least partially located at the downstream side of the first holding portion 30. Further, the second holding portion 32 is configured to hold the battery unit 60 at a second holding position (refer to FIG. 14), which is located at the downstream side of the first holding position. In the first embodiment, the second holding portion 32 is entirely arranged at the downstream side of the first holding portion 30 in the removal direction. The second holding portion 32 is spaced apart from the first holding portion 30. In a state in which the battery unit 60 is located at the first holding position, the second holding portion 32 is located closer than the first holding portion 30 to the third side wall 67C of the battery unit 60 (refer to FIG. 2). In a state in which the battery unit 60 is attached to the battery holder 12, the second holding portion 32 is located closer than the first holding portion 30 to the opening FA of the subject member F (refer to FIG. 2). The second holding portion 32 is configured to hold the battery unit 60 at the second holding position when in contact with the held portion 68.

The second holding portion 32 projects out of the support surface 22B. The second holding portion 32 is coupled in a removable manner to the first base 22. The second holding portion 32 includes an elastic member 34. The elastic member 34 includes a plate spring. The elastic member 34 is coupled to the support surface 22B so as to project from the support surface 22B. In the first battery holder 20, the second holding portion 32 is coupled in a removable manner to the first base 22. Thus, when the second holding portion 32 is unnecessary, the user can remove the second holding portion 32 from the first battery holder 20 and use the first battery holder 2s without the second holding portion 32.

The second holding portion 32 includes a deformable portion 34A and a frictional portion 34B. The deformable portion 34A and the frictional portion 34B are defined on the elastic member 34. The elastic member 34 further incudes a first spring end 34C and a second spring end 34D. In a state in which the second holding portion 32 is holding the battery unit 60 at the second holding position, force applied to remove the battery unit 60 from the first battery holder 20 deforms the deformable portion 34A and allows for removal of the battery unit 60. The frictional portion 34B contacts the battery unit 60 as the battery unit 60 moves from the first holding position to the second holding position. The deformable portion 34A and the frictional portion 34B are located between the first spring end 34C and the second spring end 34D. The elastic member 34 is L-shaped, and is bent at a middle portion between the first spring end 34C and the second spring end 34D so that the middle portion is farther from the support surface 22B than the first spring end 34C and the second spring end 34D. The frictional portion 34B is included in the portion of the elastic member 34 that is farthest from the support surface 22B. The elastic member 34 can be formed from a resin or a metal. When the elastic member 34 is formed from a metal, it is preferred that the elastic member 34 be formed by bending a metal plate.

The first spring end 34C is located at the side of the elastic member 34 that is closer to the first holding portion 30. The second holding portion 32 further includes a fastening portion 34E. The first spring end 34C is fixed in a removable manner to the first base 22 by the fastening portion 34E. One example of the fastening portion 34E is a fastener. A fastener includes a bolt. The second spring end 34D is located on the elastic member 34 at a position that is farther from the first holding portion 30 than the first spring end 34C. The second spring end 34D is not fixed to the first base 22 and movable relative to the first base 22 when the deformable portion 34A is deformed. The second holding portion 32 is coupled in a non-removable manner to the first base 22. In this case, the fastening portion 34E can be omitted, and the first spring end 34C can be fitted to the first base 22 to fix the elastic member 34 to the first base 22. Alternatively, the first spring end 34C can be adhered or welded to the first base 22 to fix the elastic member 34 to the first base 22. The second spring end 34D is in contact with the support surface 22B. It is preferred that the end surface of the second spring end 34D that contacts the support surface 22B be curved. When the elastic member 34 is formed from a metal plate, the second spring end 34D is formed by bending the end of the metal plate into a curved surface. The second spring end 34D can be fixed to the first base 22 in a removable manner or a non-removable manner.

The first battery holder 20 further includes two first supports 24 and two second supports 26. The first supports 24 and the second supports 26 are arranged on the first base 22. The first supports 24 are configured to restrict movement of the battery unit 60 in the attaching direction when the battery unit 60 is located at the first holding position. The two first supports 24 are spaced apart from each other on the first base 22 to allow for the arrangement of a cable (not shown) in between. The cable is, for example, a Bowden cable or an electric cable. The end of each of the first supports 24 at the downstream side in the attaching direction is configured to contact the subject member F.

The first supports 24 each include a second portion 24A. The second portions 24A extend from the main body 22A opposing the second side wall 67B of the battery unit 60 (refer to FIG. 4). The second portions 24A can be formed integrally with or separately from at least one of the main body 22A and the corresponding one of the first portions 26A.

The first supports 24 each include an elastic member 24B. The elastic members 24B are arranged on a second surface 24C (refer to FIG. 5) of a corresponding one of the second portions 24A that is opposed to the battery unit 60 when the battery unit 60 is located at the first holding position. It is preferred that the elastic members 24B be in contact with the second side wall 67B of the battery unit 60 when the battery unit 60 is located at the first holding position. One example for each of the elastic members 24B is an elastomeric member. An elastomer includes rubber. The elastic members 24B can be omitted. When omitting the elastic members 24B, it is preferred that the second portions 24A contact the second side wall 67B of the battery unit 60 when the battery unit 60 is located at the first holding position.

The second supports 26 respectively oppose the side walls 67A of the battery unit 60 when the battery unit 60 is located at the first holding position. The second supports 26 are configured to restrict movement of the battery unit 60 relative to the first battery holder 20 in the second direction Y. The second supports 26 each include the first portion 26A and an elastic member 26B. The elastic members 26B are arranged on a first surface 26C of a corresponding one of the first portions 26A that is opposed to the battery unit 60 when the battery unit 60 is located at the first holding position. The elastic members 26B are arranged adjacent to the corresponding one of the first supports 24. One example for each of the elastic members 26B is an elastomeric member. An elastomer includes rubber. The elastic members 24B and the elastic members 26B are formed integrally with each other but can be formed separately from each other. The elastic members 26B can be omitted. When omitting the elastic members 26B, it is preferred that the two first portions 26A respectively contact the two side walls 67A of the battery unit 60 when the battery unit 60 is located at the first holding position. The elastic members 26B can be formed by a plate spring.

The first battery holder 20 further includes a pair of first restriction portions 28. The first restriction portions 28 are arranged on the first base 22 and are configured to restrict relative movement of the battery unit 60 and the first base 22 in the first direction X. In the present embodiment, the first restriction portions 28 are located at the downstream side of the first surfaces 26C of the corresponding one of the first portions 26A in the removal direction. It is preferred that the first restriction portions 28 be arranged on each of the two first portions 26A. The first restriction portions 28 are formed integrally with at least part of the first base 22. Instead, the first restriction portions 28 can each be formed separately from the first base 22 and be coupled to the first base 22 by a fastener, an adhesive, or through welding. The first restriction portions 28 each include a first protrusion 28A. The first protrusions 28A are receivable in first recesses 72A that are arranged in the corresponding one of the side walls 67B of the battery unit 60 (refer to FIG. 4). The first protrusions 28A extend along the removal direction. The first restriction portions 28 can be arranged on the second surfaces 24C of the second portions 24A, respectively. When the first restriction portions 28 are arranged on the second surfaces 24C of the second portions 24A, the first protrusions 28A can be arranged on the second surfaces 24C, and the second side wall 67B of the battery unit 60 can include the first recesses 72A for receiving the first protrusions 28A.

The first battery holder 20 further includes a pair of connectors 36. The connectors 36 are connected in a removable manner to the subject member F (refer to FIG. 1), to which the first battery holder 20 is coupled. The connectors 36 are arranged on the first base 22. Each of the connectors 36 includes a fastener. Each of the fastener includes a bolt. It is preferred that the connectors 36 be arranged at the downstream end of the first base 22 in the attaching direction. When the connectors 36 are bolts, it is preferred that the two bolts be spaced apart in the second direction Y on the first base 22. When the connectors 36 include bolts, it is preferred that the bolts project from the downstream end of the first base 22 in the attaching direction. When the connectors 36 include bolts, each bolt is inserted into a corresponding hole of the subject member F to hold the subject member F between the first base 22 and a nut and fix the first battery holder 20 to the subject member F. The connectors 36 can include nuts or threaded holes. When each of the connectors 36 includes a nut or a threaded hole, a bolt is inserted into a hole of the subject member F to hold the subject member F between the bolt and the nut or the threaded hole of the connectors 36 and to fix the first battery holder 20 to the subject member F.

Figure 4:
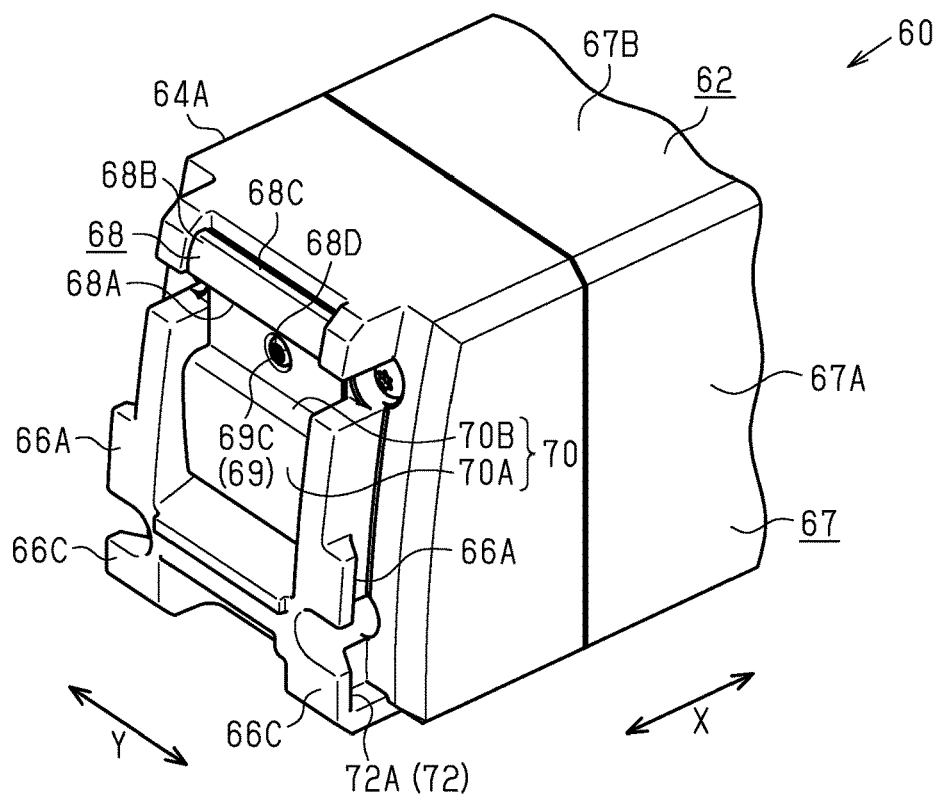
FIG. 4 is a perspective view of a first end of the battery unit shown in FIG. 2.

As shown in FIG. 4, the battery unit 60 includes the held portion 68 and a contact portion 70. The held portion 68 is located on the first end surface 66A of the housing 62 at a position separated from an end 66C at the downstream side in the removal direction. It is preferred that the held portion 68 be located on the first end surface 66A at the end adjacent to the second side wall 67B. The arrangement of the held portion 68 on the first end surface 66A at the end adjacent to the second side wall 67B allows the amount the battery unit 60 is projected from the opening FA of the subject member F to be maximized when the battery unit 60 is held at the second holding position. The battery unit 60 held at the second holding position can easily be caught by the hand of a person. This configuration facilitates the removal of the battery unit 60.

The held portion 68 is arranged on the housing 62 so as to be opposed to the first holding portion 30 (refer to FIG. 3) when the battery unit 60 is located at the first holding position (refer to FIG. 1). The held portion 68 is arranged in the middle, excluding the two ends, of the battery unit 60 in the second direction Y. The held portion 68 is formed including metal. The held portion 68 includes a projection 68A that projects outward from the housing 62 in the first direction X. The held portion 68 includes a metal plate 68B arranged on the surface of the projection 68A. The metal plate 68B is formed to cover the surface of the projection 68A. The projection 68A is formed integrally with the housing 62. The projection 68A can be omitted from the held portion 68, and the held portion 68 can be formed by only the metal plate 68B.

The housing 62 includes a coupling mechanism 69 that couples the metal plate 68B. The coupling mechanism 69 includes an engagement groove 69A, which is formed in the first end surface 66A of the housing and a threaded hole 69B (refer to FIG. 12). The engagement groove 69A opens to the downstream side in the attaching direction. The threaded hole 69B opens in the first end surface 66A of the housing 62. The metal plate 68B includes a first end 68C at the downstream side in the attaching direction. The first end 68C is bent and engaged with the engagement groove 69A. A hole 68D extends through the metal plate 68B at the downstream side of the projection 68A with respect to the removal direction. In a state in which the first end 68C is engaged with the engagement groove 69A, a bolt 69C is inserted through the hole 68D and fastened to the threaded hole 69B of the housing 62 to fix the metal plate 68B in a removable manner to the first end surface 66A of the housing 62. The metal plate 68B can be fixed in a non-removable manner to the first end surface 66A of the housing 62. The projection 68A of the held portion 68 can be formed from a metal. In this case, the projection 68A can be formed integrally with the metal plate 68B. Alternatively, the metal plate 68B can be omitted. The metal plate 68B can be omitted from the held portion 68 so that the held portion does not include metal.

The held portion 68 is configured to contact the first holding portion 30 to hold the battery unit 60 at the first holding position. In other words, contact of the held portion 68 with the first holding portion 30 holds the battery unit 60 at the first holding position. When the battery unit 60 is located at the first holding position and the first holding portion 30 is located at the first position, the first holding portion 30 contacts the held portion 68 and holds the battery unit 60 at the first holding position. When the battery unit 60 is moved from the first holding position in the removal direction, the held portion 68 is configured to contact the second holding portion 32 (refer to FIG. 3). This holds the battery unit 60 at the second holding position (refer to FIG. 14). In a state in which the second holding portion 32 is holding the battery unit 60 at the second holding position and a force acts to release the battery unit 60 from the first battery holder 20, the held portion 68 deforms the second holding portion 32 and releases the battery unit 60.

The contact portion 70 is located on the first end surface 66A of the housing 62 at the downstream side of the held portion 68 in the removal direction. The contact portion 70 is located closer to the third side wall 67C (refer to FIG. 2) than the held portion 68 in the removal direction. The contact portion 70 is located at the middle portion, excluding the two ends, of the battery unit 60 in the second direction Y. It is preferred that the contact portion 70 be formed integrally with at least part of the held portion 68. The contact portion 70 is formed from a metal. The contact portion 70 includes a metal plate. The contact portion 70 is formed integrally with the metal plate 68B of the held portion 68. The contact portion 70 is formed so that the projecting amount toward the second holding portion 32 increases from the downstream end toward the upstream side in the removal direction. The projecting amount of the contact portion 70 toward the second holding portion 32 is referred to as the projection amount in the first direction X.

The contact portion 70 includes a slope portion 70A and a retreat portion 70B (refer to FIG. 4). The slope portion 70A is formed so that, for example, the projecting amount in the first direction X increases from the downstream end to the upstream side in the removal direction. The downstream end of the contact portion 70 in the removal direction contacts the housing 62 and preferably engages the housing 62 to restrict movement in the removal direction. The retreat portion 70B is continuous with the end of the slope portion 70A at the upstream side in the removal direction and extends toward the second end 64B of the housing 62. The retreat portion 70B is continuous with the end of the held portion 68 at the downstream side in the removal direction. The metal plate forming the contact portion 70 can be a plate spring. In the contact portion 70 and the held portion 68, the most projected part of the contact portion 70 and the most projected part of the held portion 68 are located at substantially corresponding positions in the first direction X. Alternatively, the most projected part of the contact portion 70 can be formed closer to the support surface 22B than the most projected part of the held portion 68. The contact portion 70 can be formed from a synthetic resin. In this case, the contact portion 70 can be formed integrally with or separately from the housing 62. The contact portion 70 and the metal plate 68B, which are formed integrally, can be replaced by a synthetic resin plate and formed integrally from a material that differs from that of the housing 62. The contact portion 70 comes into contact with the frictional portion 34B of the second holding portion 32 (refer to FIG. 3) as the battery unit 60 moves from the first holding position to the second holding position.

The battery unit 60 further includes a pair of third restriction portions 72. The third restriction portions 72 are arranged on the first end 64A of the housing 62 and are configured to restrict relative movement of the battery unit 60 and the first battery holder 20 in the first direction X. The third restriction portions 72 are located at a position corresponding to the first restriction portions 28 in the removal direction. When the battery unit 60 is located at the first holding position, the third restriction portions 72 are opposed to the first restriction portions 28. In the present embodiment, the third restriction portions 72 are arranged at the downstream end of the first end 64A of the battery unit 60 in the removal direction. When the first restriction portions 28 are arranged on the second surfaces 24C of the second portions 24A, the third restriction portions 72 are arranged on the downstream end of the first end 64A of the battery unit 60 in the attaching direction. The third restriction portion 72 includes the first recesses 72A. Each of the first recesses 72A is configured to receive the corresponding one of the first protrusions 28A of the first restriction portions 28 (refer to FIG. 6). In the present embodiment, each of the side walls 67A includes one of the first recesses 72A. The first recesses 72A extend along the removal direction.

Figure 5:
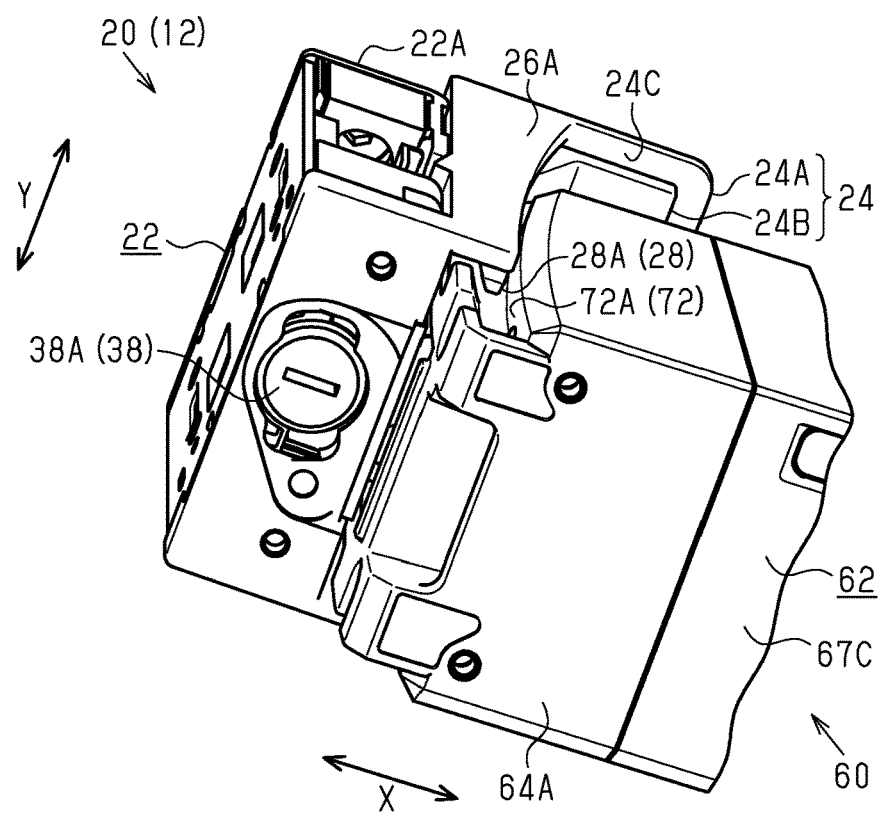
FIG. 5 is a perspective view showing the battery unit in a state in which the battery unit is being attached to the first battery holder.
Figure 6:
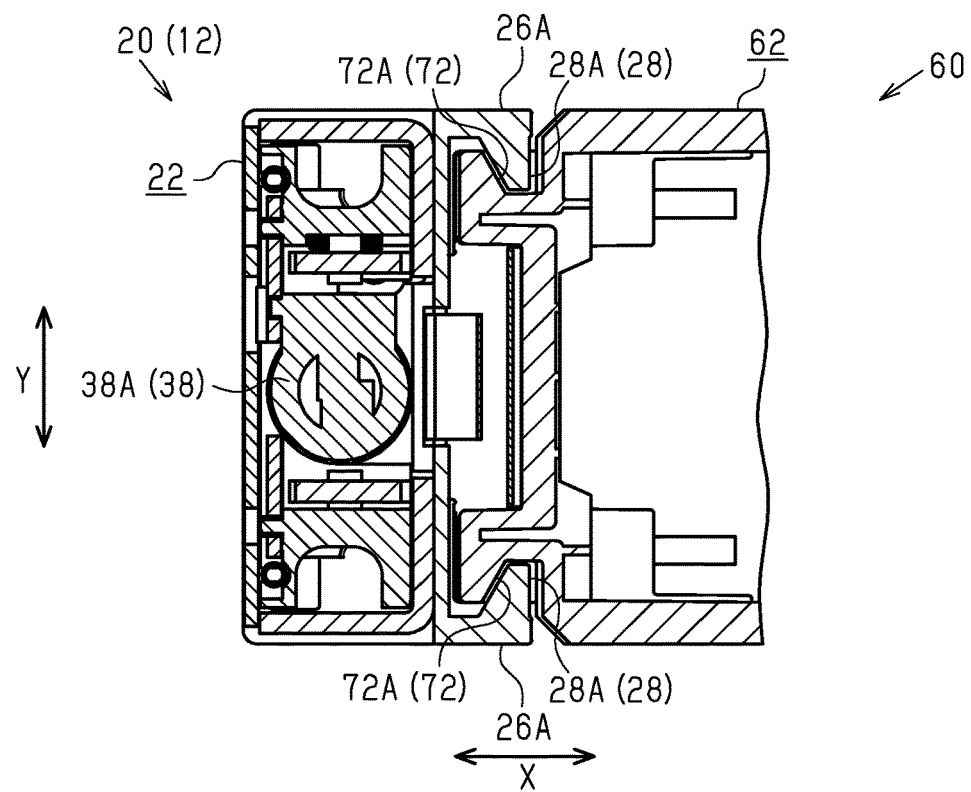
FIG. 6 is a cross-sectional view of the first battery holder and the first end of the battery unit in a state in which a first restriction portion is coupled to a third restriction portion.

As shown in FIG. 5, when attaching the battery unit 60 to the first battery holder 20, the battery unit 60 is moved relative to the first battery holder 20 in the attaching direction to insert the first protrusions 28A into the first recesses 72A. As shown in FIG. 6, when the first protrusions 28A are properly fitted into the first recesses 72A, relative movement of the battery unit 60 and the first battery holder 20 is restricted in the first direction X. For example, when impact is applied from the outside to the battery component 10 and force acts to separate the battery unit 60 from the first battery holder 20 in the first direction X, the first restriction portions 28 and the third restriction portions 72 hold the battery unit 60 and the first battery holder 20 in position with relative to each. Thus, the first battery holder 20 stably holds the battery unit 60.

The first battery holder 20 further includes a lock mechanism 38. The lock mechanism 38 is configured to hold the first holding portion 30 (refer to FIG. 3) at the first position. The lock mechanism 38 is arranged in the first base 22. The lock mechanism 38 includes a key cylinder 38A. The key cylinder 38A is operated by a key and coupled to the first holding portion 30 so that the first holding portion 30 is arranged at one of the first position and the second position in accordance with the key operation. It is preferred that the first holding portion 30 be biased to the first position by a biasing member. In this case, the key operation moves the first holding portion 30 from the first position to the second position. The first holding portion 30 can be configured so that when the first holding portion 30 is located at the first position and the key is turned in the key cylinder 38A, the first holding portion 30 moves from the first position to the second position. The first holding portion 30 can also be configured so that in a state in which the first holding portion 30 is located at the first position and the key remains turned in the key cylinder 38A, the first holding portion 30 moves from the first position to the second position when the key is pushed. Further, the first holding portion 30 can be configured so that when the first holding portion 30 is located at the second position and the key is turned in the key cylinder 38A, the first holding portion 30 moves from the second position to the first position.

Figure 7:
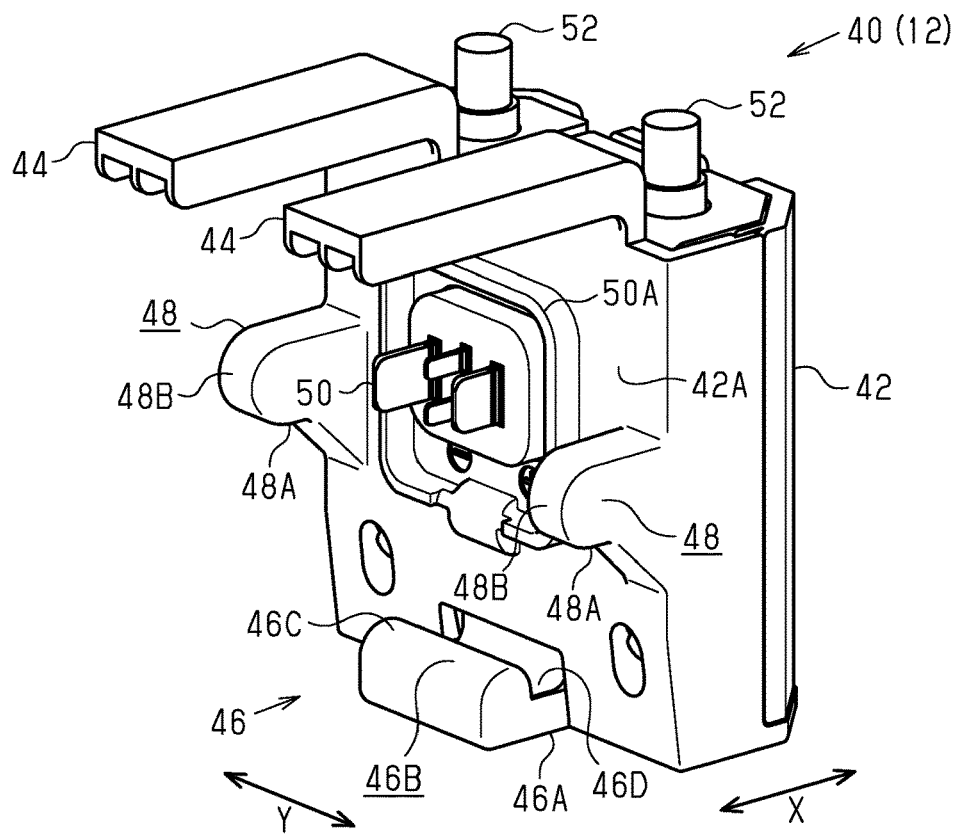
FIG. 7 is a perspective view of a second battery holder shown in FIG. 2.

As shown in FIG. 7, the second battery holder 40 includes a second base 42 and a pair of third holding portions 48. The third holding portions 48 are configured to hold the second end 64B of the battery unit 60 when the battery unit 60 is located at the first holding position. Each of the third holding portions 48 includes a rib 48A. It is preferred that the second battery holder 40 further includes a pair of third supports 44, a second restriction portion 46 and a plug 50.

The second base 42 is spaced apart from the first base 22 in the first direction X and configured to hold the second end 64B of the battery unit 60 in the first direction X (refer to FIG. 2) when the battery unit 60 is located at the first holding position. The second base 42 is opposed to the second end 64B of the battery unit 60 when the battery unit 60 is located at the first holding position. The second end 64B further includes a second end surface 66B (refer to FIG. 8) in the first direction X of the battery unit 60 and ends of the side walls 67A to 67C of the battery unit 60 at the side of the second end surface 66B.

The third supports 44 extend from the second base 42 opposing the second side wall 67B of the battery unit 60 (refer to FIG. 4) when the battery unit 60 is located at the first holding position. The second base 42 includes the two third supports 44. The two third supports 44 are spaced apart from each other on the second base 42 to allow for the arrangement of a cable in between. The end of each of the third supports 44 at the downstream side in the attaching direction is configured to contact the subject member F. The third supports 44 can be formed integrally with or separately from the second base 42. The third supports 44 can be configured to restrict movement of the battery unit 60 in the attaching direction when the battery unit 60 is located at the first holding position. In this case, the third supports 44 contact the second side wall 67B of the battery unit 60 at the first holding position. An elastic member that is similar to the elastic members 24B can be arranged between the second side wall 67B of the battery unit 60, which is located at the first holding position, and the third supports 44.

The two ribs 48A are arranged on the second base 42 sandwiching the side walls 67A of the battery unit 60 (refer to FIG. 8) when the battery unit 60 is located at the first holding position. It is preferred that the two ribs 48A be arranged on the two ends of the second base 42 in the second direction Y. It is preferred that the ribs 48A be arranged at the middle of the second base 42 in a direction orthogonal to the first direction X and the second direction Y. The ribs 48A extend along the side walls 67A of the battery unit 60. The ribs 48A each include a distal portion 48B that is curved in an arcuate manner and projects in the first direction X as viewed in the second direction Y. The ribs 48A are receivable in two fifth recesses 76 (refer to FIG. 8) that are arranged in the side walls 67A of the battery unit 60. It is preferred that the two ribs 48A, in a state inserted into the fifth recesses 76, do not project out of the fifth recesses 76 in the second direction Y.

The second restriction portion 46 is arranged on the second base 42, and is configured to restrict relative movement of the battery unit 60 and the second base 42 in the first direction X. The second restriction portion 46 opposes the second end 64B of the battery unit 60 when the battery unit 60 is located at the first holding position. The second restriction portion 46 is located on the end of the second base 42 at the downstream side in the removal direction and at the middle portion excluding the two ends in the second direction Y. The second restriction portion 46 includes a restriction base 46A and a third protrusion 46B. The restriction base 46A extends from the second base 42 opposing the third side wall 67C (refer to FIG. 8) of the battery unit 60 when the battery unit 60 is located at the first holding position.

The third protrusion 46B is located on the distal end of the restriction base 46A. The third side wall 67C of the battery unit 60a includes a third recess 74A (refer to FIG. 8). The third protrusion 46B is receivable in the third recess 74A. The third protrusion 46B serves as a pivot point around which the battery unit 60 is pivoted when removing the battery unit 60, which is located at the first holding position, from the battery holder 12 (refer to FIG. 2). Further, the third protrusion 46B serves as a pivot point around which the battery unit 60 is pivoted when attaching the battery unit 60 to the battery holder 12. The third protrusion 46B includes a distal portion 46C that has a round shape. The distal portion 46C of the third protrusion 46B is curved in an arcuate manner and projects in the attaching direction as viewed in the second direction Y.

The second restriction portion 46 can be configured to hold the second end 64B of the battery unit 60 with the third holding portions 48 when the battery unit 60 is located at the first holding position. Alternatively, the third holding portions 48 can be omitted, and the second restriction portion 46 can be configured to configured to hold the second end 64B of the battery unit 60 when the battery unit 60 is located at the first holding position.

The plug 50 is arranged on the second base 42 and electrically connectable to the battery unit 60. It is preferred that the plug 50 project from a support surface 42A of the second base 42 opposing the second end surface 66B of the battery unit 60. The plug 50 is formed to be connected to a socket 78 (refer to FIG. 8) that is arranged in the second end surface 66B of the battery unit 60 in a state in which the battery unit 60 is located at the first holding position. The second base 42 can accommodate electronic parts (not shown) that are electrically connected to the plug 50. The electronic parts include a circuit board and electric wires. A plug protector 50A can be formed around the plug 50. The plug protector 50A is projected from or recessed into the support surface 42A of the second base 42. It is preferred that the plug protector 50A be formed on the support surface 42A entirely around the plug 50. When the second base 42 includes the plug protector 50A, a socket protector 78A is formed around the socket 78 on the second end surface 66B of the battery unit 60. The socket protector 78A is configured to be fitted to the plug protector 50A in a state in which the battery unit 60 is located at the first holding position. Employment of the plug protector 50A and the socket protector 78A reduces the load applied to the terminal of the plug 50 when an impact is applied from the outside of the battery component 10 and improves the reliability of the electrical connection.

The second battery holder 40 further includes a pair of connectors 52. The connectors 52 are connected in a removable manner to the subject member F (refer to FIG. 1), to which the second battery holder 40 is coupled. Each of the connectors 52 includes a fastener. The fastener includes a bolt. It is preferred that the connectors 52 be located on the downstream end of the second base 42 in the attaching direction. When the connectors 52 include bolts, it is preferred that the two bolts be spaced apart in the second direction Y on the second base 42. When the connectors 52 include bolts, it is preferred that the bolts project from the downstream end of the second base 42 in the attaching direction. When the connectors 52 include bolts, each bolt is inserted into a corresponding hole of the subject member F to hold the subject member F between the second base 42 and a nut and fix the second battery holder 40 to the subject member F. The connectors 52 can include nuts or threaded holes. When each of the connectors 52 includes a nut or a threaded hole, a bolt is inserted into a hole of the subject member F to hold the subject member F between the bolt and the nut or threaded hole of a corresponding one of the connectors 52 and fix the second battery holder 40 to the subject member F.

Figure 8:
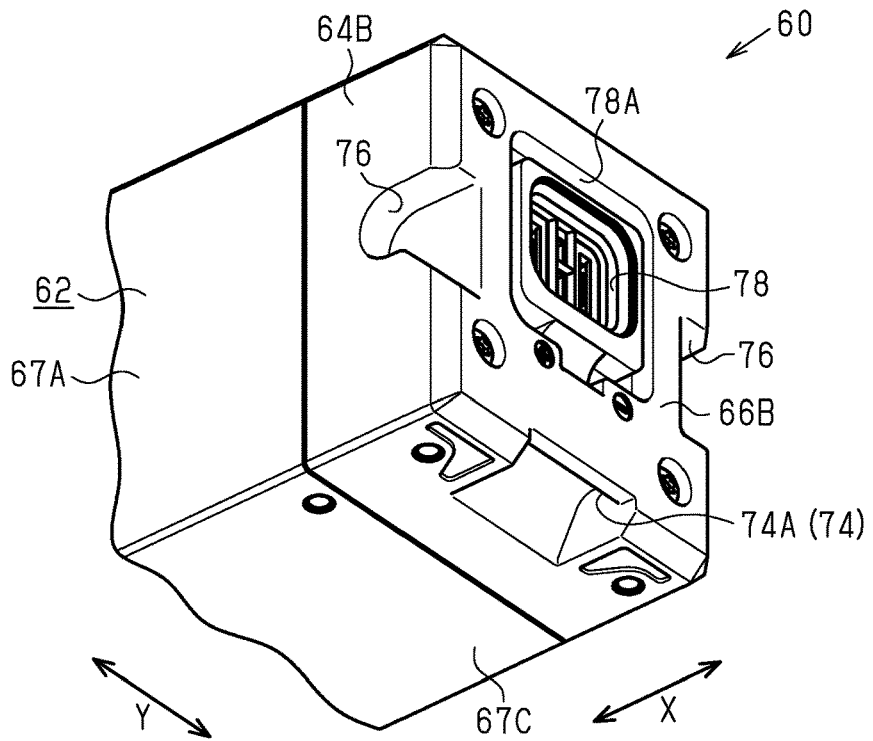
FIG. 8 is a perspective view of a second end of the battery unit shown in FIG. 2.

As shown in FIG. 8, it is preferred that the battery unit 60 further includes the fourth restriction portion 74, the fifth recesses 76 and the socket 78. The fourth restriction portion 74 is arranged in the third side wall 67C of the housing 62, and restricts relative movement of the battery unit 60 and the second battery holder 40 in the first direction X. The fourth restriction portion 74 is located on the second end 64B of the battery unit 60. The fourth restriction portion 74 includes the third recess 74A. The third protrusion 46B of the second restriction portion 46 (refer to FIG. 7) is receivable in the third recess 74A. The third recess 74A is located at the middle portion, excluding the two ends, of the housing 62 in the second direction Y. The third recess 74A is slightly larger in the second direction Y than the third protrusion 46B. It is preferred that the outer surface of the third recess 74A be shaped in conformance with the outer surface of the third protrusion 46B.

The fifth recesses 76 are arranged in the second end 64B of the battery unit 60. The two fifth recesses 76 are arranged in the housing 62. The two fifth recesses 76a are respectively arranged in the side walls 67A of the housing 62. The fifth recesses 76 open in the second end surface 66B of the housing 62. The fifth recesses 76 are located at the middle portion of the battery unit 60 in the insertion direction. The fifth recesses 76 are substantially shaped in conformance with the ribs 48A. The socket 78 is arranged in the second end surface 66B of the housing 62. The plug 50 is connectable to the socket 78. It is preferred that the socket 78 be located near the third side wall 67C.

Figure 9:
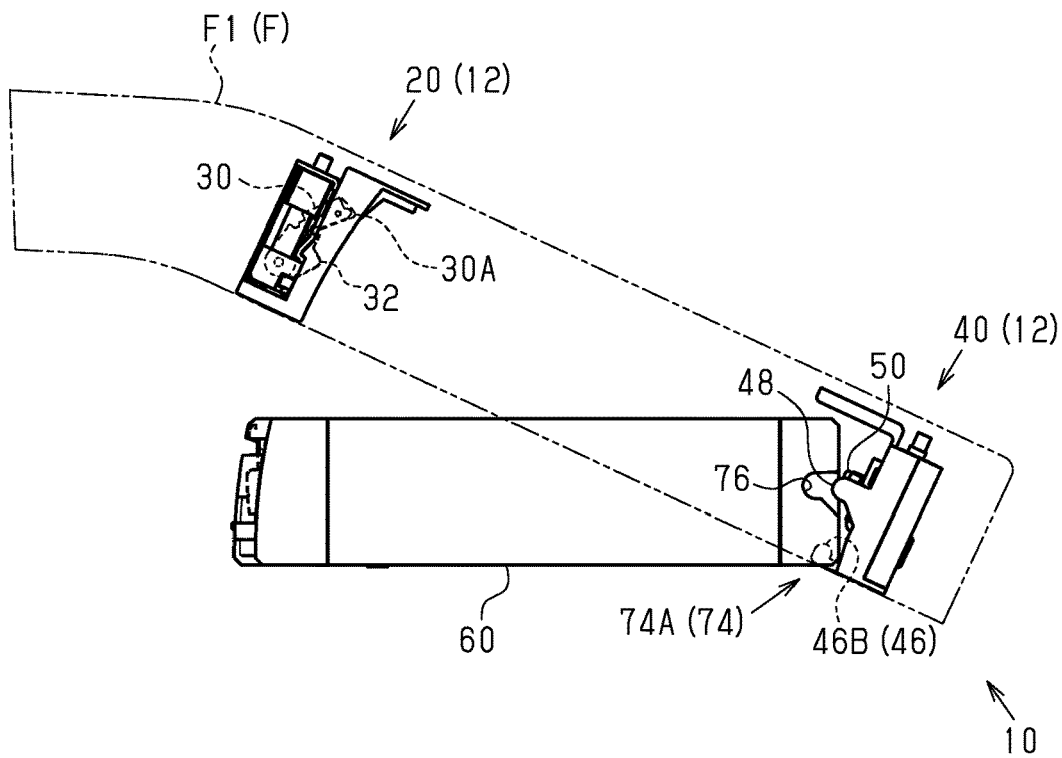
FIG. 9 is a side view of the battery component in a first state when attaching the battery unit shown in FIG. 2 to the battery holder.
Figure 10:
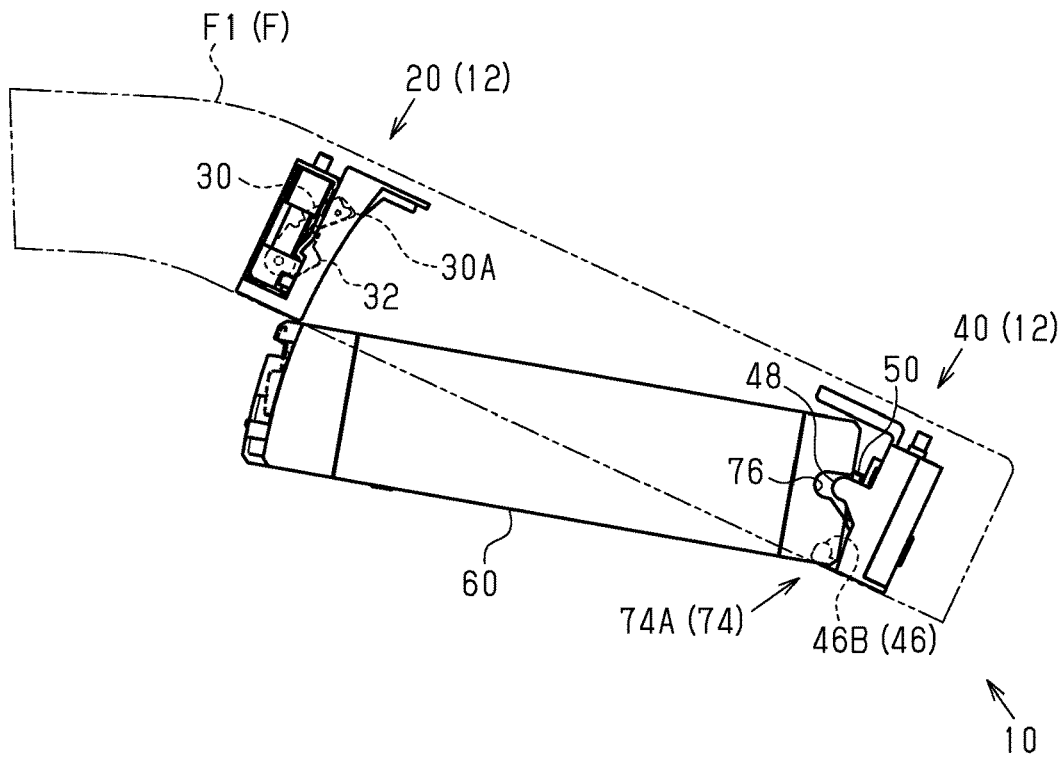
FIG. 10 is a side view of the battery component in a second state when attaching the battery unit shown in FIG. 2 to the battery holder.

The procedures for attaching the battery unit 60 to the battery holder 12 will now be described with reference to FIGS. 9 to 11. In this case, the first holding portion 30 is urged to the first position by the biasing member, and there is no need to use the key to attach the battery unit 60 to the battery holder 12. Referring to FIG. 9, in a first attachment operation, the third recess 74A of the battery unit 60 is hooked onto the third protrusion 46B of the second battery holder 40.

In a second attachment operation, the battery unit 60 is pivoted about the third protrusion 46B to move the battery unit 60 in the attaching direction relative to the battery holder 12. Referring to FIG. 10, the ribs 48A of the second battery holder 40 fit into the fifth recesses 76 of the battery unit 60 during attachment of the battery unit 60 to the battery holder 12.

Figure 11:
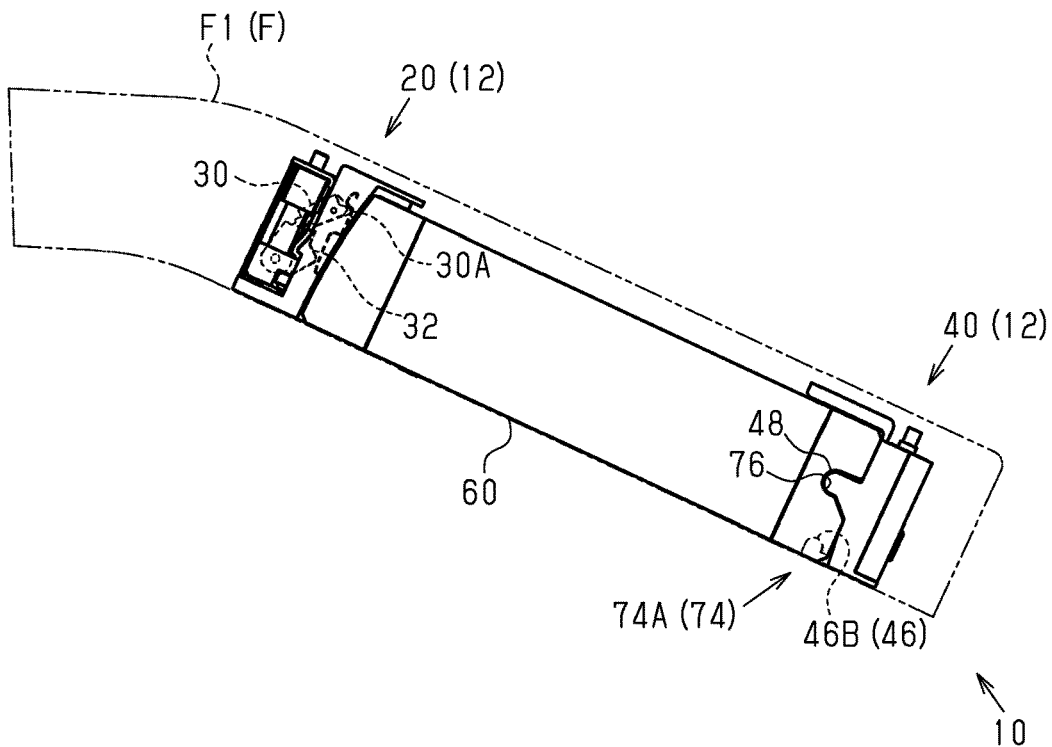
FIG. 11 is a side view of the battery component in a state in which the battery unit shown in FIG. 2 is attached to the battery holder.

Referring to FIG. 11, the battery unit 60 is further pivoted in the attaching direction to insert the plug 50 of the second battery holder 40 into the socket 78 of the battery unit 60 (refer to FIG. 8) so that the first protrusions 28A of the first battery holder 20 fits into the first recesses 72A of the battery unit 60 (refer to FIG. 5).

When pivoting the battery unit 60 toward the first holding position, the second holding portion 32 contacts the held portion 68. However, when further pivoting the battery unit 60 in the attaching direction with the second holding portion 32 in contact with the held portion 68, the second holding portion 32 deforms the held portion 68 and moves beyond the second holding portion 32. When the battery unit 60 is further pivoted in the attaching direction, the held portion 68 pushes the first holding portion 30, which is located at the first position and biased by the biasing member, to the second position. Then, the held portion 68 moves over a distal end 30A of the first holding portion 30. As the held portion 68 moves over the distal end 30A of the first holding portion 30, the biasing member returns the first holding portion 30 to the first position. Thus, the distal end 30A of the first holding portion 30 contacts the held portion 68 from the downstream side in the attaching direction. These procedures attach the battery unit 60 to the battery holder 12.

When the key needs to be used to attach the battery unit 60 to the battery holder 12, the key is inserted into the key cylinder 38A and turned to move the first holding portion 30 from the first position to the second position. In this state, the procedures described above are performed. When the battery unit 60 is arranged at the first holding position, the key in the key cylinder 38A is turned in this state to move the first holding portion 30 from the second position to the first position.

Figure 12:
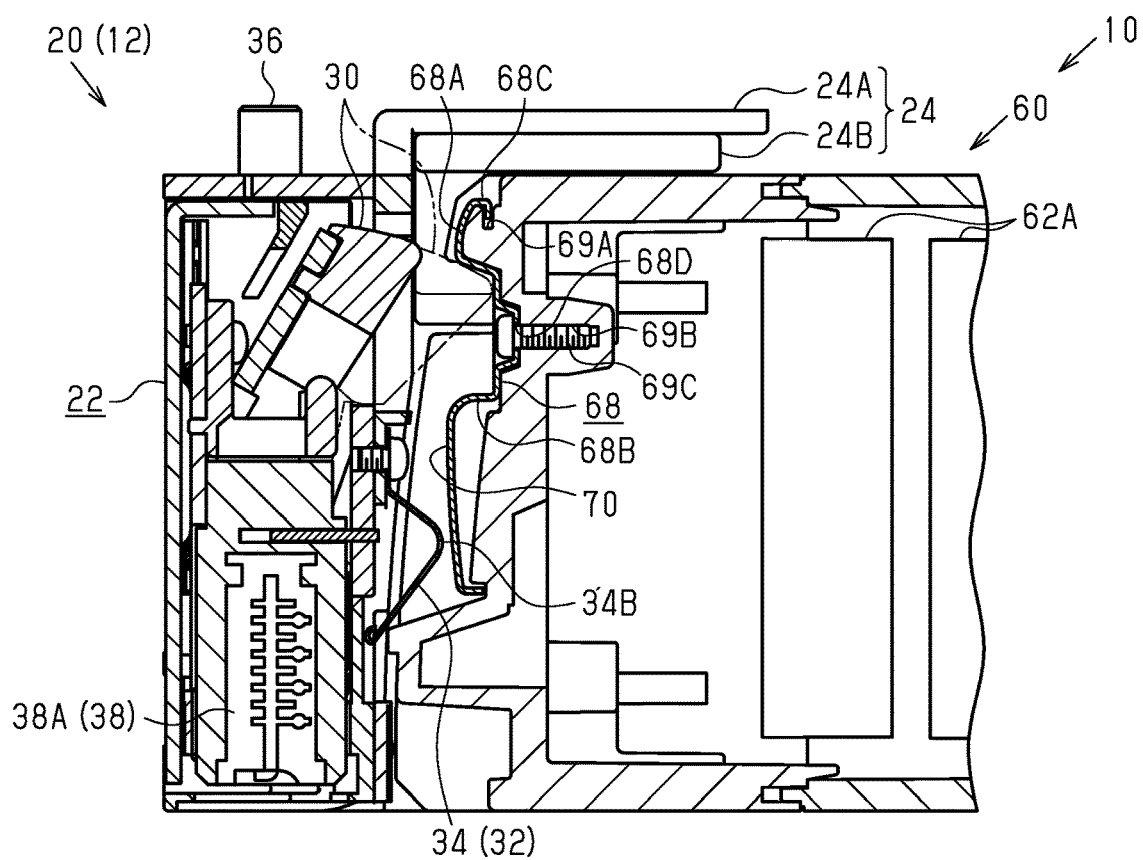
FIG. 12 is a cross-sectional view of the first battery holder and the first end of the battery unit in a state in which the battery unit shown in FIG. 2 is attached to the battery holder.

The procedures for removing the battery unit 60 from the battery holder 12 will now be described with reference to FIGS. 12 to 14. Referring to FIG. 12, in a first removal operation, the first holding portion 30 is moved from the first position to the second position to separate the first holding portion 30 from the held portion 68. As a result, the first holding portion 30 no longer holds the held portion 68, and the battery unit 60 starts to move relative to the battery holder 12 from the first holding position in the removal direction. The double-dashed line in FIG. 12 shows the first holding portion 30 at the second position. When the opening FA of the subject member F (refer to FIG. 1) is directed downward, the weight of the battery unit 60 pivots the battery unit 60 about the third protrusion 46B.

Figure 13:
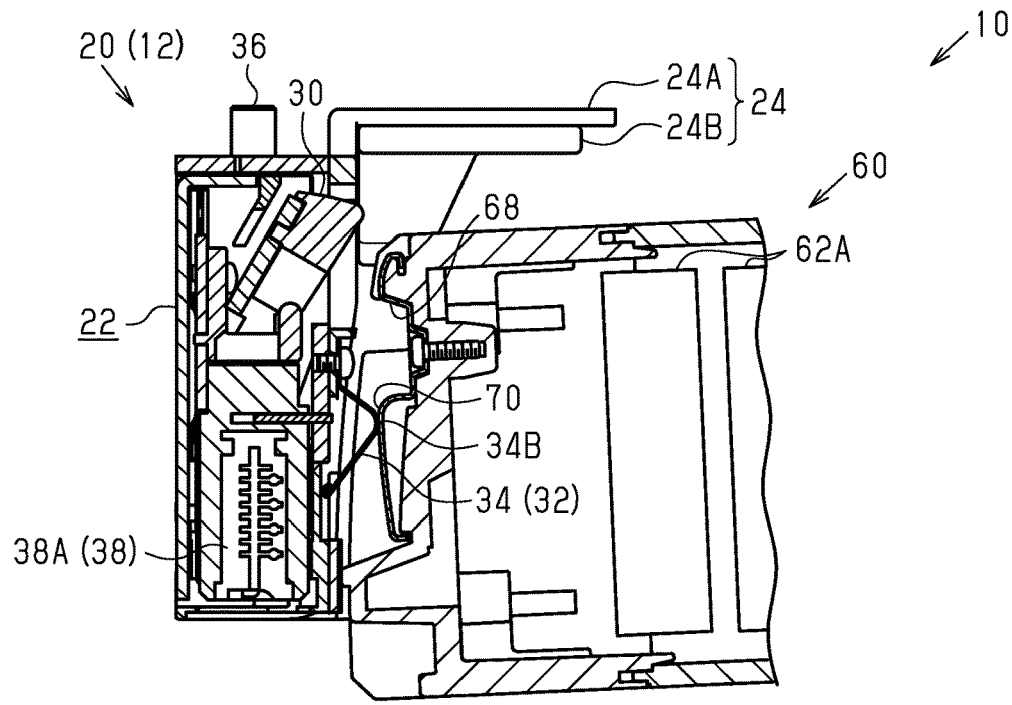
FIG. 13 is a cross-sectional view of the first battery holder and the first end of the battery unit in a state in which a frictional portion and a contact portion are in contact with each other in the battery component shown in FIG. 1.

Referring to FIG. 13, as the battery unit 60 moves from the first holding position to the second holding position, the frictional portion 34B of the second holding portion 32 contacts the contact portion 70 of the battery unit 60. It is preferred that the frictional portion 34B and the contact portion 70 be configured so that when the weight of the battery unit 60 pivots the battery unit 60 about the third protrusion 46B, contact of the frictional portion 34B with the contact portion 70 reduces the movement speed of the battery unit 60 but does not stop movement of the battery unit 60.

Figure 14:
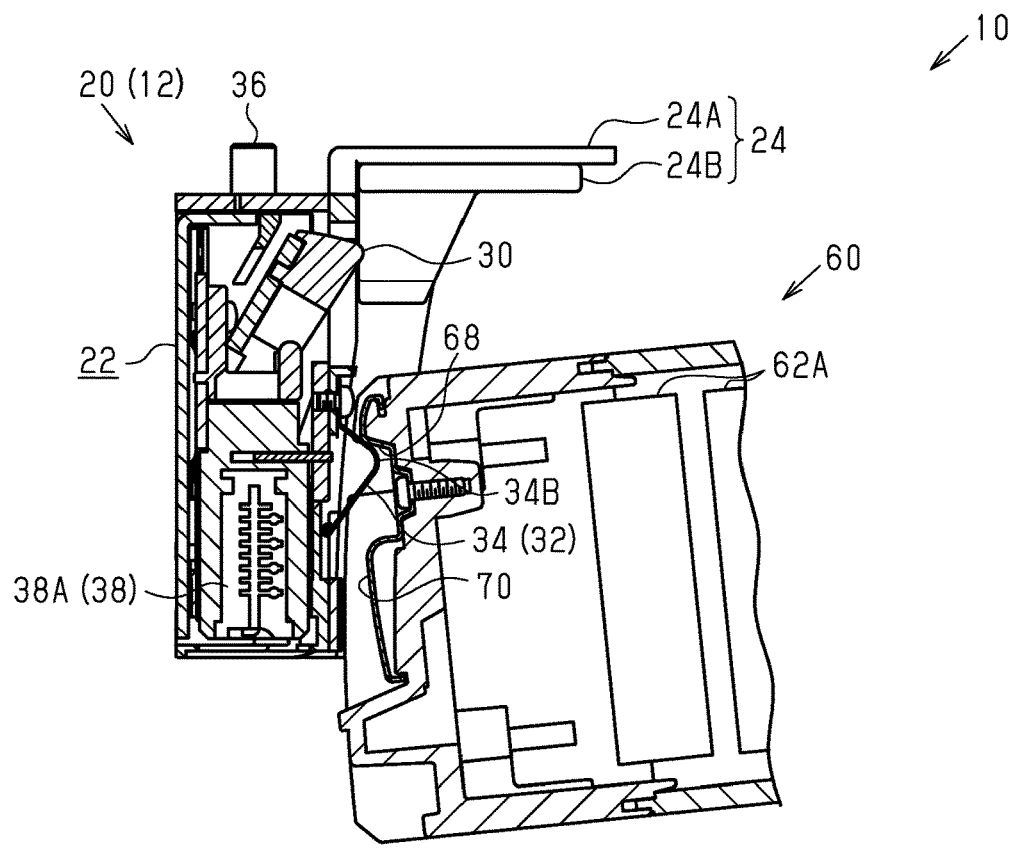
FIG. 14 is a cross-sectional view of the first battery holder and the first end of the battery unit in a state in which the battery unit shown in FIG. 2 is held at a second holding position by a second holding portion.

Referring to FIG. 14, after the contact portion 70 moves beyond the frictional portion 34B in the removal direction, the elastic member 34 contacts the held portion 68 and holds the battery unit 60 at the second holding position. In a second removal operation, a person holds the battery unit 60 and applies force to the battery unit 60 in the removal direction. As a result, the held portion 68 deforms the deformable portion 34A of the elastic member 34, and the held portion 68 moves beyond the elastic member 34 in the removal direction. This removes the battery unit 60 from the first battery holder 20. In a third removal operation, the third recess 74A of the battery unit 60 is removed from the third protrusion 46B of the second battery holder 40. These procedures remove the battery unit 60 from the battery holder 12.

Second Embodiment

Figure 16:
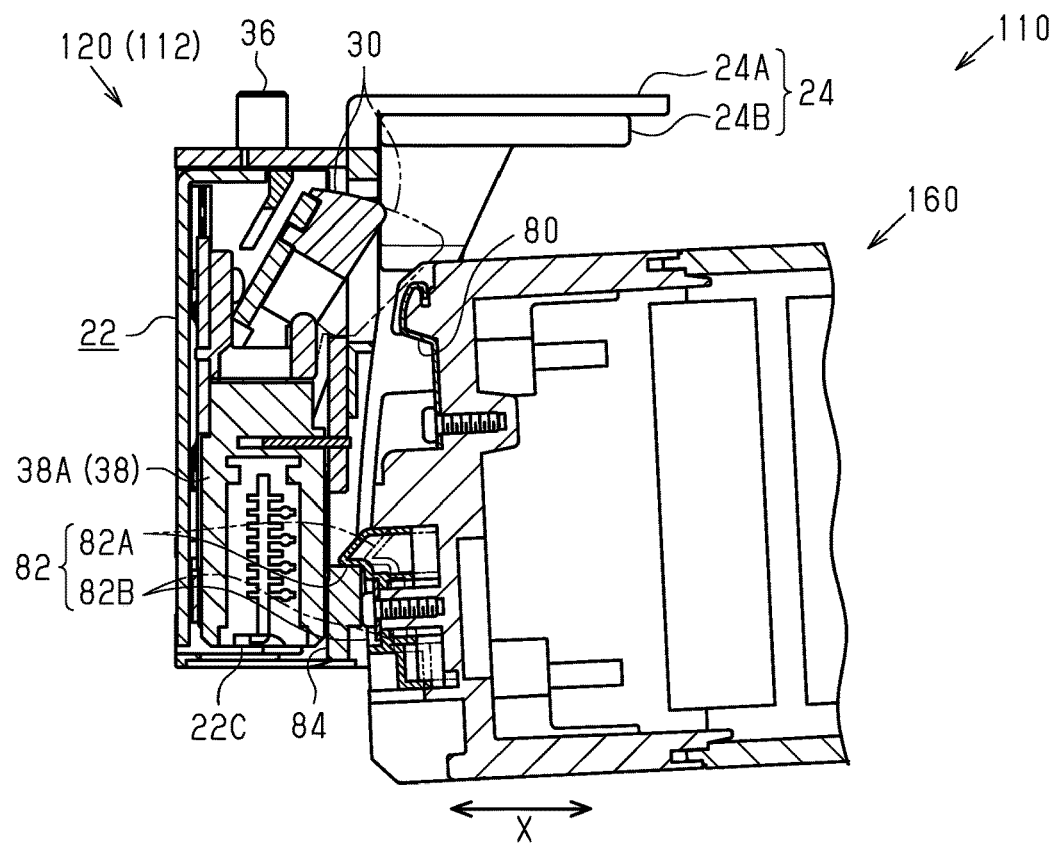
FIG. 16 is a cross-sectional view of a first battery holder and the battery unit in a state in which the battery unit shown in FIG. 15 is held at a second holding position by a second holding portion.

As seen in FIG. 16, a battery component 110 in accordance with a second embodiment is illustrated. The battery component 110 differs from the battery component 10 of the first embodiment in the points described below. Otherwise, the structure of the battery component 110 is substantially the same as the battery component 10. Like or same reference numerals are given to those elements that are the same as the corresponding elements of the first embodiment. Such elements will not be described in detail.

The battery component 110 of the second embodiment includes a battery holder 112 and a battery unit 160 (refer to FIG. 16). The battery holder 112 includes a first battery holder 120 and the second battery holder 40.

Figure 15:
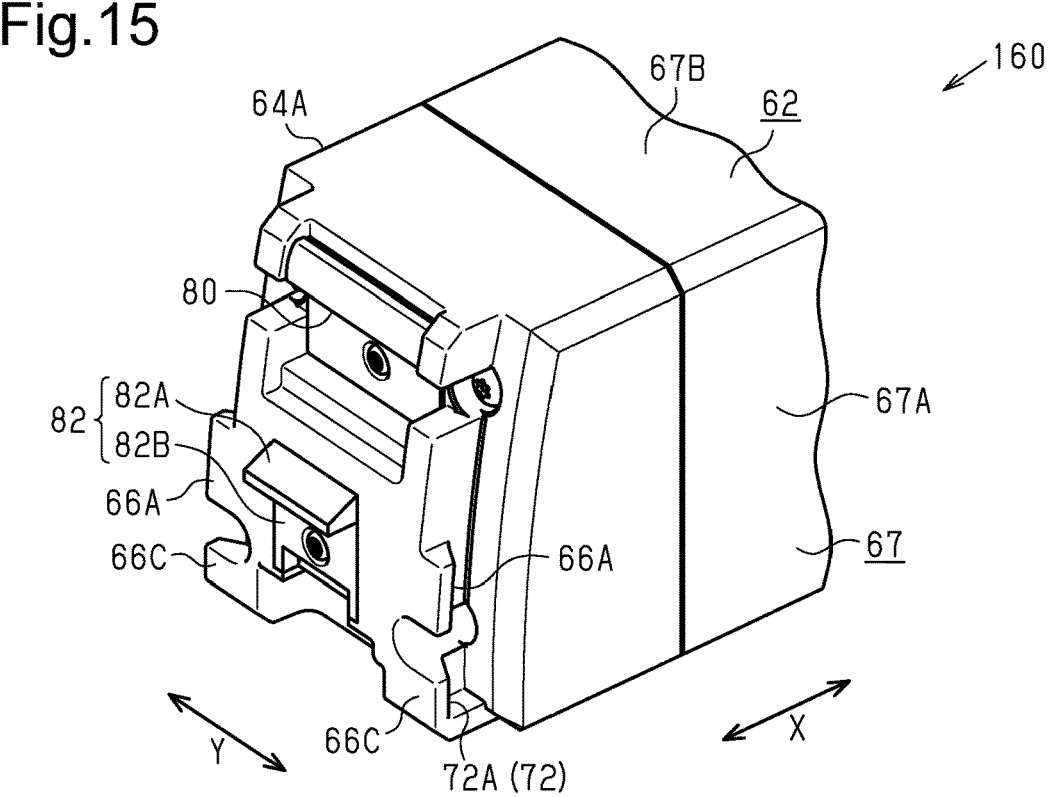
FIG. 15 is a perspective view showing a first end of a battery unit of a second embodiment.

As shown in FIG. 15, the battery unit 160 of the second embodiment includes a first held portion 80 and a second held portion 82. The first held portion 80 has substantially the same structure as the held portion 68 in the first embodiment (refer to FIG. 4), and thus, the first held portion 80 will not be described in detail herein. The second held portion 82 is located on the first end surface 66A of the housing 62 at the downstream side of the first held portion 80 in the removal direction. When the battery unit 160 is moved from the first holding position in the removal direction, the second held portion 82 comes into contact with the second holding portion 84 of the first battery holder 120 (refer to FIG. 16). This holds the battery unit 160 at the second holding position. The contact portion 70 (refer to FIG. 4) is omitted from the battery unit 160.

As shown in FIG. 16, the first battery holder 120 includes the second holding portion 84 instead of the second holding portion 32 (refer to FIG. 3). The second holding portion 84 is arranged on the first base 22 and at least partially located at the downstream side of the first holding portion 30 in the removal direction. In the present embodiment, the second holding portion 84 is entirely located at the downstream side of the first holding portion 30 in the removal direction. The second holding portion 84 is arranged on the support surface 22B of the first base 22 at an end 22C located at a downstream side in the removal direction. The second holding portion 84 comes into contact with the second held portion 82, and holds the battery unit 160 at the second holding position. The second holding portion 84 can be formed integrally with or separately from the first base 22. The second holding portion 84 projects from the support surface 22B of the first base 22 toward the battery unit 160 that is located at the first holding position.

The second held portion 82 is movably arranged on the housing 62 to move between a contact position and a non-contact position. The second held portion 82 is configured to contact the second holding portion 84 at the contact position and separated from the second holding portion 84 at the non-contact position. The second held portion 82 is moved relative to the housing 62 in the first direction X to one of the contact position and the non-contact position. The double-dashed lines in FIG. 16 shows the first holding portion 30 located at the first position, and shows the second held portion 82 located at the non-contact position.

The second held portion 82 includes a hook 82A and a support 82B. The hook 82A is formed integrally with the support 82B. The battery unit 160 includes an elastic member (not shown) that pushes the support 82B and arranges the hook 82A at the contact position. The elastic member is located between the housing 62 and the support 82B. One example of the elastic member is a spring. The hook 82A is arranged at the non-contact position when the support 82B is pushed in the first direction X toward the housing 62.

When removing the battery unit 160 from the battery holder 112, the battery unit 160 is moved from the first holding position in a state in which the second held portion 82 is located at the contact position. As a result, the second holding portion 84 comes into contact with the hook 82A of the second held portion 82. This holds the battery unit 160 at the second holding position. In the example shown in FIG. 16, when the battery unit 160 is located at the second holding position, the support 82B is partially exposed to the outside. The exposed portion of the support 82B is pushed in the first direction X toward the housing 62 to move the hook 82A from the contact position to the non-contact position. This releases the battery unit 160 from the second holding portion 84 and removes the battery unit 160 from the battery holder 112.

Third Embodiment

As seen in FIGS. 17 to 20, a battery component 210 in accordance with a third embodiment is illustrated. The battery component 210 differs from the battery component 10 in the points described below of the first embodiment. Otherwise, the structure of the battery component 210 is substantially the same as the battery component 10. Like or same reference numerals are given to those elements that are the same as the corresponding elements of the first embodiment. Such elements will not be described in detail.

Figure 18:
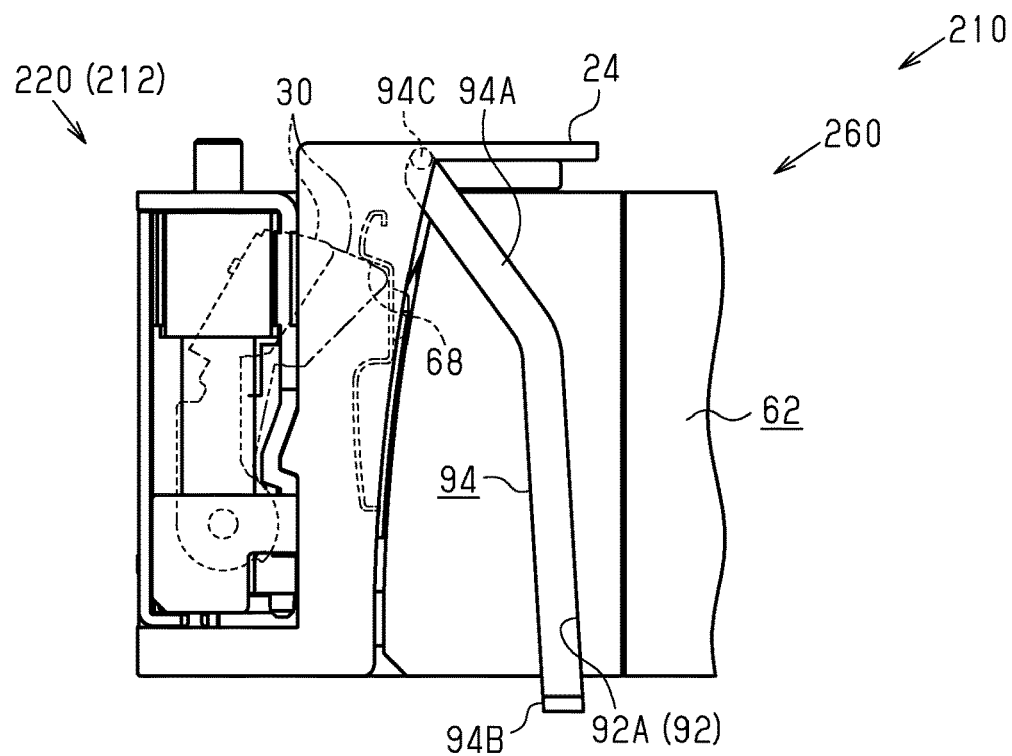
FIG. 18 is a side view of a first battery holder and the first end of the battery unit in a state in which the battery unit shown in FIG. 17 is attached to a first battery holder.

The battery component 210 of the third embodiment includes a battery holder 212 and a battery unit 260 (refer to FIG. 18). The battery holder 212 includes a first battery holder 220 and the second battery holder 40.

Figure 17:
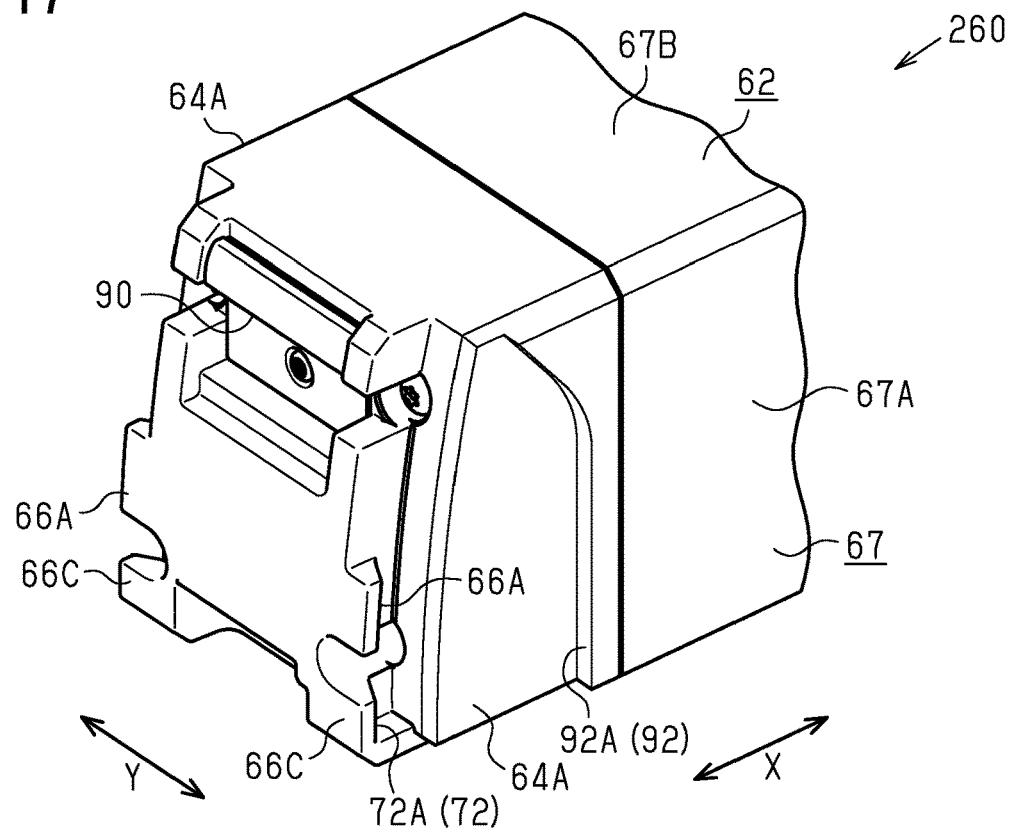
FIG. 17 is a perspective view showing a first end of a battery unit of a third embodiment.

As shown in FIG. 17, the battery unit 260 of the third embodiment includes a held portion 90. The held portion 90 has substantially the same structure as the held portion 68 of the first embodiment (refer to FIG. 4), and thus, the held portion 90 will not be described in detail herein. The side walls 67A of the housing 62 each include a step 92. The battery unit 260 does not include the contact portion 70 (refer to FIG. 4).

The step 92 on each of the side walls 67A extends from the edge of the third side wall 67C to the edge of the second side wall 67B. The portions of the steps 92 closer to the second side wall 67B are curved toward the first end surface 66A. The steps 92 are formed so that the portions of the steps 92 that are closer to the first end surface 66A each have a smaller dimension in the second direction Y than the second end surface 66B.

As shown in FIG. 18, the battery holder 220 includes a second holding portion 94 instead of the second holding portion 32 (refer to FIG. 3). The second holding portion 94 is a rod-like member extending in the second direction Y. The second holding portion 94 is arranged on the first base 22 and at least partially located at the downstream side of the first holding portion 30 in the removal direction. The second holding portion 94 includes two first arms 94A and a second arm 94B. The opposite ends of the second arms 94B in the second direction Y are supported by lower ends of the two first arms 94A. The first arms 94A and the second arm 94B have a generally U-shaped configuration. In the present embodiment, a portion of each of the first arms 94A and the entire second arm 94B is located at the downstream side of the first holding portion 30 in the removal direction. The second arm 94B can be formed integrally with the first arms 94A.

The two first arms 94A are coupled to the first base 22 or the first supports 24. The first arms 94A each include a pivot support 94C. The pivot support 94C is arranged on the first base 22 or the corresponding first support 24, and is pivotal about an axis parallel to the second direction Y. The first arms 94A are, for example, shaped in conformance with the steps 92. When the battery unit 260 is moved from the first holding position (refer to FIG. 18) in the removal direction, each of the first arms 94A is pushed by a step surface 92A of the corresponding one of the steps 92. This swings the second arm 94B toward the first base 22. When the battery unit 260 is moved in the removal direction from the first holding position, the third side wall 67C of the battery unit 260 comes into contact with the second arm 94B. The second arm 94B supports the third side wall 67C, and holds the battery unit 260 at the second holding position (refer to FIG. 19). When the battery unit 260 is held by the first holding portion 30 at the first holding position, the second holding portion 94 is arranged so that the first arms 94A are in contact with the step surfaces 92A of the steps 92.

One example of the procedures for removing the battery unit 260 from the battery holder 212 will now be described with reference to FIGS. 18 to 20. The first removal operation that disengages the first holding portion 30 from the held portion 90 is substantially the same as the first embodiment, and thus, the first removal operation will not be described. The double-dashed line in FIG. 18 shows the first holding portion 30 held at the first position.

Figure 19:
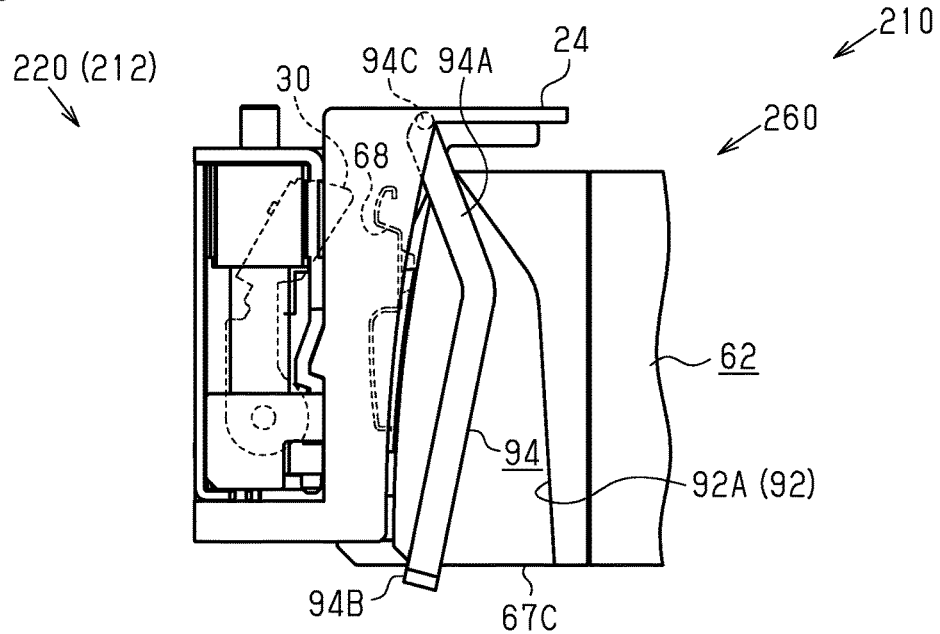
FIG. 19 is a side view of the first battery holder and the first end of the battery unit in a state in which the battery unit shown in FIG. 17 is held at a second holding position by a second holding portion.
Figure 20:
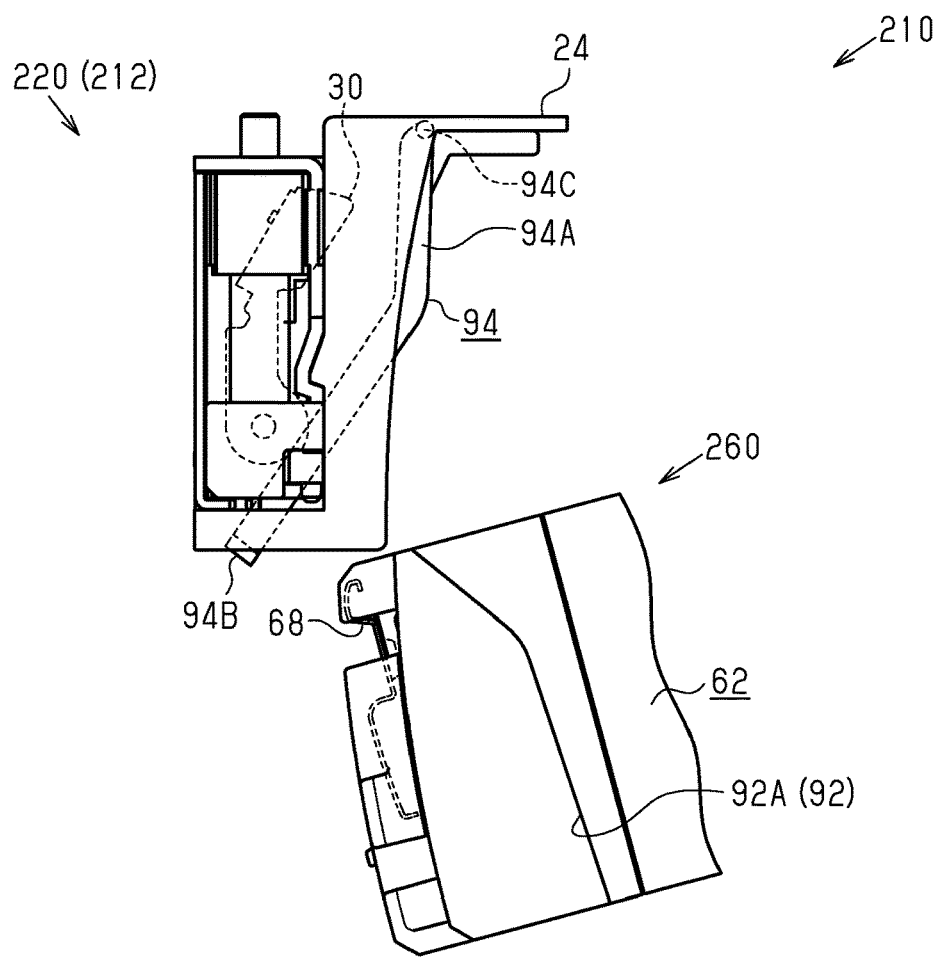
FIG. 20 is a side view of the first battery holder and the battery unit in a state in which the battery unit shown in FIG. 17 is released from the first battery holder.

As shown in FIG. 19, when the battery unit 260 is moved from the first holding position in the removal direction, the steps 92 push the first arms 94A, and the first arms 94A start to pivot about the pivot supports 94C. When the first arms 94A are pivoted to a predetermined position, the second arm 94B comes into contact with the battery unit 260, and the second arm 94B holds the battery unit 260 at the second holding position.

In a second removal operation, a person holds the battery unit 260 and the second holding portion 94 and further pivots the first arms 94A to separate the second holding portion 94 from the battery unit 260. This allows the battery unit 260 to be moved in the removal direction, and the battery unit 260 is removed from the battery holder 212 as shown in FIG. 20.

Modified Examples

The above embodiments exemplify different forms of the battery holder, the battery unit, and the battery component that includes the battery holder and the battery unit in accordance with the present invention. The present invention can be embodied by a combination of two or more of the embodiments described above and modified examples described below.

The battery component 10 in a modified example of the first embodiment includes an elongated member and a coupling portion instead of the second holding portion 32 and the elastic member 34. The elongated member has a predetermined length. The elongated member includes a cord, a chain, or a belt. The material of the elongated member can be a synthetic resin, a metal, or a natural material. One end of the elongated member is fixed to the first base 22. The other end of the elongated member is coupled in a removable manner to a coupling portion. The coupling portion is arranged on the first end 64A of the battery unit 60.

When attaching the battery unit 60 to the battery holder 12, the elongated member is coupled to the coupling portion. During removal of the battery unit 60 from the battery holder 12, when the battery unit 60 is moved in the removal direction, a cord member holds the battery unit 60 at the second holding position, which is located at the downstream side of the first holding position in the removal direction. Thus, when moving the battery unit from the first holding position to the second holding position, there is no need for a person to hold and support the battery unit. This simplifies the removal of the battery unit from the battery holder. The cord member is removed from the coupling portion to remove the battery unit 60 from the battery holder 12.

The first recesses 72A do not necessarily have to extend in the removal direction. For example, the first recesses 72A can extend in a direction that is oblique to the removal direction. The first protrusions 28A can also extend in a direction that is oblique to the removal direction.

Figure 21:
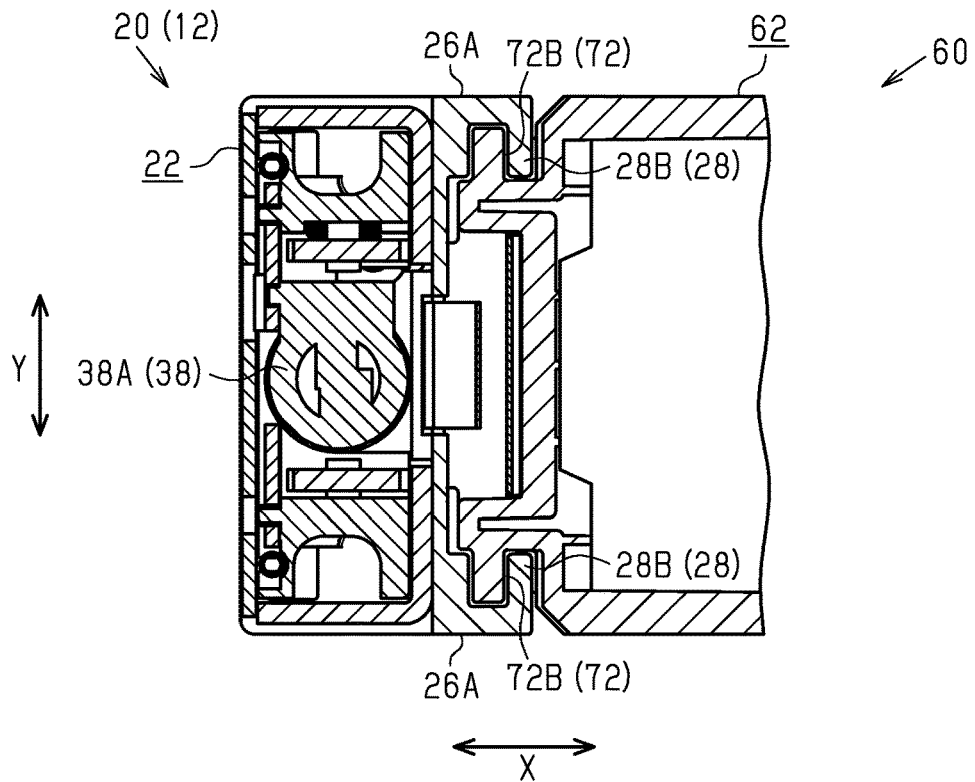
FIG. 21 is a cross-sectional view of a modified example showing a first battery holder and a first end of a battery unit in a state in which a first restriction portion and a third restriction portion are coupled.

As shown in FIG. 21, each of the third restriction portions 72 can include a second protrusion 72B instead of or in addition to the first recesses 72A. The first restriction portions 28 of this modified example can include a pair of second recesses 28B instead of or in addition to the first protrusions 28A. The second protrusions 72B of the third restriction portions 72 are receivable in the second recesses 28B of the first restriction portion 28. In the example shown in FIG. 21, the third restriction portions 72 includes the second protrusions 72B instead of the first recesses 72A, and the first restriction portions 28 includes the second recesses 28B instead of the first protrusions 28A.

In the battery unit 60 of the first embodiment, the contact portion 70 can be omitted. In this modified example, the frictional portion 34B can be omitted from the second holding portion 32. Thus, when moving the battery unit 60 from the first holding position to the second holding position, the battery unit 60 does not interfere with the first battery holder 20.

The held portion 68 does not necessarily have to be formed integrally with the contact portion 70. The held portion 68 can be separate from the contact portion 70.

The fifth recesses 76 can be omitted. In this case, the second restriction portion 46 functions as a third holding portion.

At least one of the two ribs 48A can be omitted, and the fifth recesses 76 corresponding to the omitted ribs 48A can be omitted from the battery unit 60.

The distal portions 46C of the third protrusions 46B can be shaped to include a corner.

Figure 22:
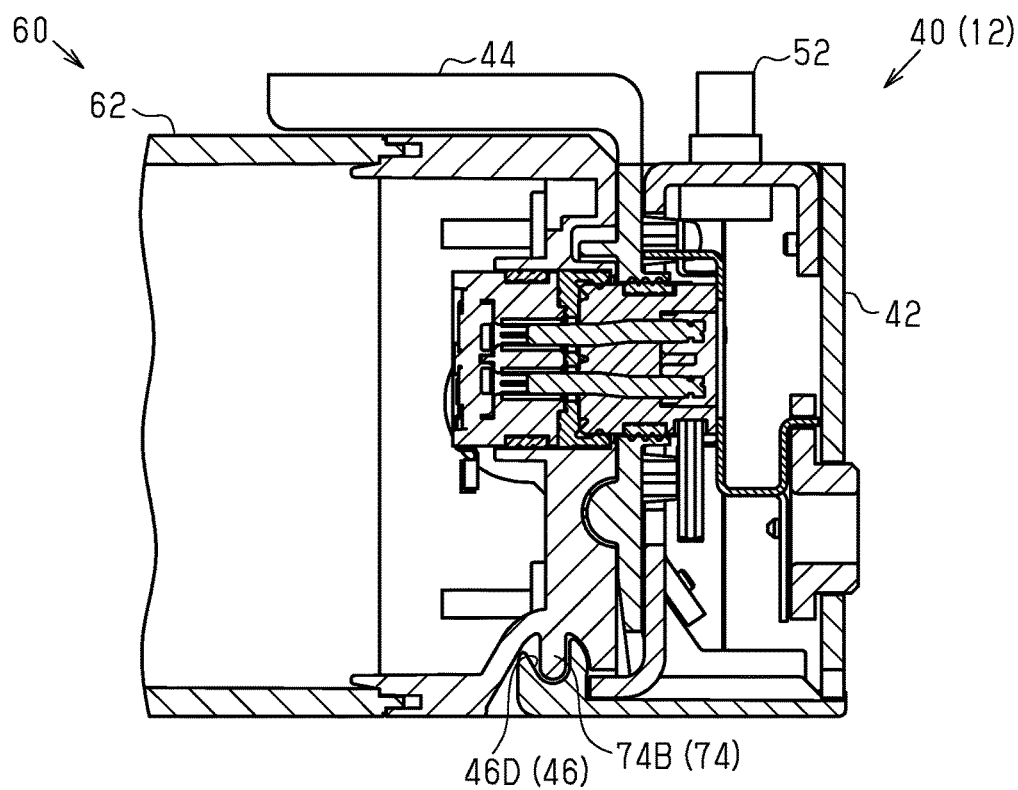
FIG. 22 is a cross-sectional view of a second battery holder and a second end of a battery unit in a battery component of a modified example.

As shown in FIG. 22, the second restriction portion 46 can include a fourth recess 46D instead of or in addition to the third protrusion 46B. The fourth restriction portion 74 of this modified example can include a fourth protrusion 74B instead of or in addition to the third recess 74A. The fourth protrusion 74B of the fourth restriction portion 74 is receivable in the fourth recess 46D of the second restriction portion 46. In the example shown in FIG. 22, the second restriction portion 46 includes the fourth recess 46D instead of the third protrusion 46B, and the fourth restriction portion 74 includes the fourth protrusion 74B instead of the third recess 74A.

The second restriction portion 46 can be omitted from the second battery holder 40, and the fourth restriction portion 74 can be omitted from the battery unit 60. The lock mechanism 38 does not necessarily have to be arranged in the first base 22. The lock mechanism 38 can be coupled to the outer surface of the first base 22.

The lock mechanism 38 can be omitted from the first battery holders 20, 120, and 220. In this case, an operation unit is arranged on the first base 22, and is operable by the user to move the first holding portion 30 between the first position and the second position. The operation unit includes a button or a lever. For example, when the operation unit is not operated, the first holding portion 30 is biased by a biasing member to the first position. When the operation unit is operated, the first holding portion 30 is moved from the first position to the second position.

The connectors 36 can be omitted from the first battery holders 20, 120, and 220. The first battery holders 20, 120, and 220 can be adhered or welded to be fixed to the subject member F. The connectors 36 of the first battery holders 20, 120, and 220 can be arranged on the corresponding first battery holders 20, 120, and 220 at one of an end in the second direction Y, the end opposite to the support surface 22B in the first direction X, and the end at the downstream side in the removal direction. At least one of the first battery holders 20, 120, and 220 can be formed integrally with the subject member F.

The connectors 52 can be omitted from the second battery holder 40. The second battery holder 40 can be adhered or welded to be fixed to the subject member F. The connectors 52 of the second battery holder 40 can be arranged on the second battery holder 40 at one of an end in the second direction Y, the end opposite to the support surface 42A in the first direction X, and the end at the downstream side in the removal direction. At least a portion of the second battery holder 40 can be formed integrally with the subject member F.

The first battery holders 20, 120, and 220 can at least partially be formed integrally with the second battery holder 40. The first battery holders 20, 120, and 220 can be shaped as a box having one open side when formed integrally with the second battery holder 40.

The second holding portion 32 can be configured to contact a held portion that is separate from the held portion 68 of the battery unit 60 to hold the battery unit 60 at the second holding position.

The elastic member 34 can be formed from an elastomer or by a resin spring.

At least one of the first holding portion 30 and the second holding portion 32 can be arranged on the first portions 26A to contact the side walls 67A of the housing 62. At least one of the held portion 68 and the contact portion 70 can be arranged on the side walls 67A of the housing 62 in correspondence with the first holding portion 30 and the second holding portion 32.

The second holding portion 32 can be omitted from the first battery holders 20, 120, and 220.

The first restriction portion 28 can be formed separately from the first base 22 and be coupled to the first base 22.

The first restriction portion 28 can be arranged on the first supports 24 or on the support surface 22B.

The third restriction portion 72 can be omitted from the battery unit 60.

The two first supports 24 can be formed integrally with each other without any space in between that would be used to allow for the arrangement of a cable. The first supports 24 can each include a hole or a cable to allow for the arrangement of a cable. The two third supports 44 can be formed integrally with each other without any space in between that would be used to allow for the arrangement of a cable. The two third supports 44 can each include a hole or a cable to allow for the arrangement of a cable.

At least one of the first supports 24, the second supports 26, and the third supports 44 can be omitted from the battery holders 12, 112 and 212.

The second battery holder 40 can be omitted from the battery holders 12, 112 and 212.

The battery unit 60 can have the form of a regular hexahedron.

The subject member F does not have to be a bicycle and can be a vehicle, a building, or an electronic device. Elements electrically connected to the battery holder 12 include electronic components.

The opening FA of the bicycle in which the battery component 10 is arranged can be open sideward or upward in a state in which the bicycle is on level ground.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A battery holder for holding a battery unit inside an accommodating space of a subject member, the battery unit having an elongated shape extending in a longitudinal direction of the battery unit, the battery holder comprising:
   a first battery holder configured to be attached to the subject member inside the accommodating space; and
   a second battery holder,
   the first battery holder including:
      a first base that opposes one longitudinal end of the battery unit along the longitudinal direction in a state in which the battery unit is held by the first battery holder;
      a first restriction portion arranged on the first base and configured to restrict relative movement of the battery unit with respect to the first base in both directions along the longitudinal direction of the battery unit, the first restricting portion being arranged on a downstream side of the first base in a removal direction in which the battery unit is moved when the battery unit is removed from the battery holder, the removal direction being substantially perpendicular to the longitudinal direction; and
      a holding portion movably arranged on the first base between a first position and a second position, the first position being a position at which the holding portion contacts a held portion of the battery unit and holds the battery unit at a holding position, and the second position being a position at which the holding portion is separated from the held portion, and
   the second battery holder including a second base spaced apart from the first base in the longitudinal direction to allow the battery unit to be arranged between the first base and the second base, the second base being configured to hold another longitudinal end of the battery unit in the state in which the battery unit is held by the battery holder.

2. The battery holder according to claim 1, wherein
   the first base includes a first portion opposed to a side wall of the battery unit that extends along the longitudinal direction.

3. The battery holder according to claim 2, wherein
   the first restriction portion is arranged on the first portion.

4. The battery holder according to claim 1, wherein
   the first restriction portion is formed integrally with at least a portion of the first base.

5. The battery holder according to claim 1, further comprising
   a pair of supports arranged on the first base and configured to restrict movement of the battery unit at the first holding position in a direction opposite to a direction in which the battery unit is removed from the battery holder, and the supports are spaced apart from each other on the first base to allow for arrangement of a cable in between.

6. The battery holder according to claim 1, further comprising
a second restriction portion arranged on the second base, the second restriction portion being configured to restrict relative movement of the battery unit and the second base in along the longitudinal direction.

7. The battery holder according to claim 6, wherein
the second restriction portion includes at least one of a third protrusion and a fourth recess, the third protrusion is receivable in a third recess arranged in a side wall of the battery unit that extends along the longitudinal direction, and the fourth recess is configured to receive a fourth protrusion arranged on the side wall of the battery unit.

8. The battery holder according to claim 7, wherein
the second restriction portion includes the third protrusion, the third protrusion forming a pivot point about which the battery unit is pivoted upon removal of the battery unit from the battery holder, and
the third protrusion includes a distal end having a curved shape.

9. The battery holder according to claim 1, further comprising
a pair of ribs arranged on the second base, the ribs sandwiching a pair of side walls of the battery unit that extend along the longitudinal direction.

10. The battery holder according to claim 9, wherein
the ribs are receivable in corresponding fifth recesses arranged in the battery unit.

11. The battery holder according to claim 1, further comprising
a plug arranged on the second base, and electrically connectable to the battery unit.

12. The battery holder according to claim 1, wherein
the first battery holder includes a pair of connectors for securing the first base to the subject member inside the accommodating space, the subject member being a portion of a bicycle frame.

13. The battery holder according to claim 1, wherein
the first restricting portion comprises a pair of first protrusions spaced apart from each other in a widthwise direction of the first battery holder that is perpendicular to the longitudinal direction and the removal direction, the pair of first protrusions being configured to engage with a third restriction portion of the battery unit.

14. The battery holder according to claim 13, wherein
the pair of first protrusions of the first restriction portion are receivable in a pair of first recesses arranged in a side wall of the battery unit, the side wall extending along the longitudinal direction.

15. The battery holder according to claim 1, wherein
the first position is a position at which the holding portion protrudes farther away from the first base in the longitudinal direction to contact the held portion, and
the second position is a position at which the holding portion protrudes less from the first base in the longitudinal direction so as to be separated from the held portion.

16. A battery unit having an elongated shape extending in a longitudinal direction of the battery unit and configured to be held by a battery holder including a first battery holder and a second battery holder disposed at opposite longitudinal ends of the battery unit such that the battery unit is accommodated inside an accommodating space of a subject member, the battery unit comprising:
a housing configured to accommodate a battery cell;
a held portion arranged on one longitudinal end of the housing along the longitudinal direction to contact a holding portion of the battery holder, which is removable relative to the housing, and arranged to hold the battery unit at a holding position when in contact with the holding portion;
a third restriction portion arranged on the one longitudinal end of the housing along the longitudinal direction to restrict relative movement of the battery unit and the first battery holder in both directions along the longitudinal direction of the battery unit, the third restriction portion being arranged on a downstream side of the one longitudinal end in a removal direction in which the battery unit is moved when the battery unit is removed from the first battery holder, the removal direction being substantially perpendicular to the longitudinal direction; and
a fourth restriction portion arranged on another longitudinal end of the housing opposite the one longitudinal end along the longitudinal direction, the fourth restriction portion restricting relative movement of the battery unit and the second battery holder in both directions along the longitudinal direction of the battery unit,
a pair of fifth recesses disposed on opposite lateral side walls of the battery unit at the other longitudinal end of the battery unit, the pair of fifth recesses being spaced apart from each other in a widthwise direction perpendicular to the longitudinal direction and the removal direction, each of the fifth recesses opening through a longitudinal end surface of the battery unit at the other longitudinal end.

17. The battery unit according to claim 16, wherein
the held portion protrudes in the longitudinal direction from the one longitudinal end and extends along a widthwise direction perpendicular to the longitudinal direction and the removal direction.

18. The battery unit according to claim 16, further comprising
a contact portion arranged on the one longitudinal end of the housing in a position downstream of the held portion in the removal direction, the contact portion extending away from the held portion in the removal direction while sloping inward toward the one longitudinal end in the longitudinal direction.

19. The battery unit according to claim 16, wherein
the third restriction portion includes at least one of a pair of recesses and a pair of protrusions spaced apart from each other in the widthwise direction and configured to engage with a pair of first protrusions of a first restriction portion of the battery holder.

20. The battery unit according to claim 19, wherein
the third restriction portion includes the pair of recesses,
the pair of recesses are arranged in a side wall of the battery unit, the side wall extending in the longitudinal direction, and
the pair of recesses extend along the removal direction.

21. The battery unit according to claim 16, wherein
the fourth restriction portion includes a third recess that opens toward the downstream side and is at least partially closed in a direction away from the one longitudinal end along the longitudinal direction, the third recess being configured to hook onto a third protrusion of the second battery holder such that relative movement of the battery unit and the second battery holder is restricted.

22. The battery unit according to claim 18, wherein
the held portion and the contact portion are formed integrally from a metal plate.

23. A battery component comprising:
a battery unit having an elongated shape extending in a longitudinal direction of the battery unit; and a battery holder configured to hold the battery unit in an accommodating space of a subject member, the battery holder including a first battery holder and a second battery holder, the battery unit including
- a housing configured to accommodate a battery cell;
- a held portion arranged on one longitudinal end of the housing; and
- a third restriction portion arranged on the one longitudinal end of the housing along the longitudinal direction to restrict relative movement of the battery unit and the battery holder in both directions along the longitudinal direction of the battery unit, the third restriction portion being arranged on a downstream side of the one longitudinal end in a removal direction in which the battery unit is moved when the battery unit is removed from the battery holder, the removal direction being substantially perpendicular to the longitudinal direction, the first battery holder including
- a first base that opposes the one longitudinal end of the battery unit along the longitudinal direction in the state in which the battery unit is held by the battery holder;
- a first restriction portion arranged on the first base and configured to restrict relative movement of the battery unit with respect to the first base in both directions along the longitudinal direction of the battery unit, the first restricting portion being located on a downstream side of the first base in the removal direction;
- a holding portion movably arranged on the first base between a first position and a second position, the first position being a position at which the holding portion contacts the held portion of the battery unit and holds the battery unit and the second position being a position at which the holding portion is separated from the held portion, and the second battery holder including
- a second base spaced apart from the first base in the longitudinal direction to allow the battery unit to be arranged between the first base and the second base, the second base being configured to hold another longitudinal end of the battery unit in the state in which the battery unit is held by the battery holder.

24. The battery holder according to claim 23, wherein the battery unit further includes a contact portion arranged on the one longitudinal end of the housing in a position downstream of the held portion in the removal direction, the contact portion extending away from the held portion in the removal direction while sloping inward toward the one longitudinal end in the longitudinal direction.

25. The battery component according to claim 23, wherein
the first restricting portion comprises a pair of first protrusions spaced apart from each other in a widthwise direction of the first battery holder that is perpendicular to the longitudinal direction and the removal direction, the pair of first protrusions being configured to engage with a third restriction portion of the battery unit, and
the third restriction portion includes at least one of a pair of recesses and a pair of protrusions spaced apart from each other in the widthwise direction and configured to engage with a pair of first protrusions of a first restriction portion of the battery holder.

26. A battery unit having an elongated shape extending in a longitudinal direction of the battery unit and configured to be held by a battery holder including a first battery holder and a second battery holder disposed at opposite longitudinal ends of the battery unit such that the battery unit is accommodated inside an accommodating space of a subject member, the battery unit comprising:
- a housing configured to accommodate a battery cell;
- a held portion arranged on one longitudinal end of the housing along the longitudinal direction to contact a holding portion of the battery holder, which is removable relative to the housing, and arranged to hold the battery unit at a holding position when in contact with the holding portion;
- a contact portion arranged on the one longitudinal end of the housing in a position downstream of the held portion in the removal direction, the contact portion extending away from the held portion in the removal direction while sloping inward toward the one longitudinal end in the longitudinal direction;
- a third restriction portion arranged on the one longitudinal end of the housing along the longitudinal direction to restrict relative movement of the battery unit and the first battery holder in both directions along the longitudinal direction of the battery unit, the third restriction portion being arranged on a downstream side of the one longitudinal end in a removal direction in which the battery unit is moved when the battery unit is removed from the first battery holder, the removal direction being substantially perpendicular to the longitudinal direction; and
- a fourth restriction portion arranged on another longitudinal end of the housing opposite the one longitudinal end along the longitudinal direction, the fourth restriction portion restricting relative movement of the battery unit and the second battery holder in both directions along the longitudinal direction of the battery unit,
the held portion and the contact portion being formed as integrally from a metal plate.

27. A battery unit having an elongated shape extending in a longitudinal direction of the battery unit and configured to be held by a battery holder including a first battery holder and a second battery holder disposed at opposite longitudinal ends of the battery unit such that the battery unit is accommodated inside an accommodating space of a subject member, the battery unit comprising:
- a housing configured to accommodate a battery cell;
- a held portion arranged on one longitudinal end of the housing along the longitudinal direction to contact a holding portion of the battery holder, which is removable relative to the housing, and arranged to hold the battery unit at a holding position when in contact with the holding portion;
- a third restriction portion arranged on the one longitudinal end of the housing along the longitudinal direction to restrict relative movement of the battery unit and the first battery holder in both directions along the longitudinal direction of the battery unit, the third restriction portion being arranged on a downstream side of the one longitudinal end in a removal direction in which the battery unit is moved when the battery unit is removed from the first battery holder, the removal direction being substantially perpendicular to the longitudinal direction;
- a fourth restriction portion arranged on another longitudinal end of the housing opposite the one longitudinal end along the longitudinal direction, the fourth restriction portion including a recess configured to restrict relative movement of the battery unit with respect to the second battery holder in both directions along the longitudinal direction of the battery unit; and a socket provided on the other longitudinal end of the housing in a position upstream of the recess in the removal direction, the socket being configured to be electrically connected to a plug of the second battery holder.

* * * * *